US009303149B2

(12) United States Patent
Rao et al.

(10) Patent No.: US 9,303,149 B2
(45) Date of Patent: Apr. 5, 2016

(54) ADHESION PROMOTING ADDUCTS CONTAINING METAL LIGANDS, COMPOSITIONS THEREOF, AND USES THEREOF

(71) Applicant: PRC-DeSoto International, Inc., Sylmar, CA (US)

(72) Inventors: Chandra Rao, Valencia, CA (US); Jun Deng, Murrysville, PA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 0 days.

(21) Appl. No.: 14/065,521

(22) Filed: Oct. 29, 2013

(65) Prior Publication Data

US 2014/0051789 A1  Feb. 20, 2014

Related U.S. Application Data

(63) Continuation-in-part of application No. 13/529,183, filed on Jun. 21, 2012, now Pat. No. 8,513,339, and a continuation-in-part of application No. 13/923,941, filed on Jun. 21, 2013, and a continuation-in-part of application No. 13/923,903, filed on Jun. 21, 2013.

(51) Int. Cl.
*C08K 5/548* (2006.01)
*C08K 5/544* (2006.01)
*C08G 75/02* (2006.01)
*C09J 181/02* (2006.01)
*C08L 81/02* (2006.01)

(52) U.S. Cl.
CPC ............... *C08K 5/548* (2013.01); *C08G 75/02* (2013.01); *C08K 5/544* (2013.01); *C08L 81/02* (2013.01); *C09J 181/02* (2013.01)

(58) Field of Classification Search
None
See application file for complete search history.

(56) References Cited

U.S. PATENT DOCUMENTS

| 3,138,573 | A |   | 6/1964  | Le Fave et al. |
| 3,955,036 | A | * | 5/1976  | Plueddemann ............... 428/429 |
| 4,029,679 | A | * | 6/1977  | Kotzsch et al. ............... 549/219 |
| 4,366,307 | A |   | 12/1982 | Singh et al. |
| 4,421,654 | A | * | 12/1983 | Plueddemann ............... 210/698 |
| 4,609,762 | A |   | 9/1986  | Morris et al. |
| 4,623,711 | A |   | 11/1986 | Morris et al. |
| 4,718,944 | A | * | 1/1988  | Plueddemann .......... 106/287.11 |

(Continued)

FOREIGN PATENT DOCUMENTS

| WO | WO 2008/077045 S2 |   | 6/2008  |              |
| WO | WO 2010106888     | * | 9/2010  | ............. C08F 4/654 |
| WO | WO 2012002932 A1  | * | 1/2012  | ............. A61F 13/04 |

OTHER PUBLICATIONS

Martell et al., "Coordination of Al (III) in the environment and in biological systems," Coordination Chemistry Reviews, 1996, 149, 311-328 (18 pages).

(Continued)

*Primary Examiner* — Robert S Loewe
(74) *Attorney, Agent, or Firm* — William R. Lambert

(57) ABSTRACT

Disclosed are adhesion promoting adducts containing adhesion promoting groups and metal ligands and compositions such as sealant compositions useful in aerospace applications comprising the adhesion promoting adducts. The adhesion promoting adducts are useful as adhesion promoting additives or as a copolymerizable reactant in polymer compositions.

43 Claims, 3 Drawing Sheets

(56) References Cited

U.S. PATENT DOCUMENTS

| | | | | |
|---|---|---|---|---|
| 4,798,889 A * | 1/1989 | Plueddemann et al. | ...... | 556/401 |
| 4,800,125 A * | 1/1989 | Plueddemann | ............... | 428/405 |
| 4,818,779 A * | 4/1989 | Witucki et al. | ............... | 524/188 |
| 4,863,978 A * | 9/1989 | Plueddemann | ............... | 523/213 |
| 4,912,239 A * | 3/1990 | Bank et al. | .................... | 556/401 |
| 4,981,986 A * | 1/1991 | Yoshioka et al. | ............. | 556/410 |
| 5,041,593 A * | 8/1991 | Plueddemann | ............... | 556/440 |
| 5,073,195 A * | 12/1991 | Cuthbert et al. | .................. | 106/2 |
| 5,089,300 A * | 2/1992 | Plueddemann | ............... | 427/299 |
| 5,225,472 A | 7/1993 | Cameron et al. | | |
| 5,270,364 A | 12/1993 | Schwartz et al. | | |
| 5,284,888 A | 2/1994 | Morgan | | |
| 6,123,179 A | 9/2000 | Chen | | |
| 6,153,719 A * | 11/2000 | Abbey et al. | .................... | 528/89 |
| 6,172,179 B1 | 1/2001 | Zook et al. | | |
| 6,184,280 B1 | 2/2001 | Shibuta | | |
| 6,372,849 B2 * | 4/2002 | DeMoss et al. | ............... | 525/212 |
| 6,410,768 B1 * | 6/2002 | Llatas et al. | .................. | 556/424 |
| 6,509,418 B1 | 1/2003 | Zook et al. | | |
| 6,525,168 B2 | 2/2003 | Zook et al. | | |
| 7,009,032 B2 | 3/2006 | Bojkova et al. | | |
| 7,671,145 B2 | 3/2010 | Sawant et al. | | |
| 7,858,705 B2 * | 12/2010 | Parent et al. | .................. | 525/240 |
| 7,879,955 B2 | 2/2011 | Rao et al. | | |
| 8,507,617 B2 | 8/2013 | Hobbs et al. | | |
| 8,513,339 B1 | 8/2013 | Keledjian et al. | | |
| 8,541,513 B2 | 9/2013 | Hobbs et al. | | |
| 2005/0010003 A1 | 1/2005 | Sawant et al. | | |
| 2006/0240245 A1 * | 10/2006 | Ishida et al. | ............... | 428/312.6 |
| 2006/0270796 A1 | 11/2006 | Sawant et al. | | |
| 2007/0287810 A1 | 12/2007 | Rao et al. | | |
| 2009/0186960 A1 * | 7/2009 | Moszner et al. | ............... | 523/116 |
| 2009/0326167 A1 | 12/2009 | Sawant et al. | | |
| 2010/0010133 A1 | 1/2010 | Zook et al. | | |
| 2010/0036063 A1 | 2/2010 | Sawant et al. | | |
| 2010/0041839 A1 | 2/2010 | Anderson et al. | | |
| 2010/0130687 A1 * | 5/2010 | Tu et al. | ...................... | 525/104 |
| 2010/0184103 A1 * | 7/2010 | Jing et al. | ...................... | 435/7.32 |
| 2011/0077351 A1 * | 3/2011 | Gilmore et al. | ............... | 524/609 |
| 2011/0092639 A1 | 4/2011 | Rao et al. | | |
| 2011/0319559 A1 | 12/2011 | Kania et al. | | |
| 2012/0040103 A1 | 2/2012 | Keledjian et al. | | |
| 2012/0040104 A1 | 2/2012 | Keledjian et al. | | |
| 2012/0164904 A1 * | 6/2012 | Fay et al. | ...................... | 442/293 |
| 2012/0234205 A1 | 9/2012 | Hobbs et al. | | |
| 2013/0345371 A1 | 12/2013 | Anderson et al. | | |

OTHER PUBLICATIONS

Mather et al., "Michael addition reactions in macromolecular design for emerging technologies," Progress in Polymer Science, 2006, vol. 31, p. 487-531 (45 pages).

Yokel, "Aluminum chelation principles and recent advances," Coordination Chemistry Reviews, 2002, vol. 228, p. 97-113 (17 pages).

* cited by examiner

| Structures | $\Delta H_g$ (kcal/mol) | $\Delta G_g$ (kcal/mol) | $\Delta H_w$ (kcal/mol) | $\Delta G_w$ (kcal/mol) |
|---|---|---|---|---|
| Al$_4$O$_6$ Acetoacetate | -46.56 | -33.66 | -45.41 | -32.51 |
| Al$_4$O$_6$ BSP | -71.00 | -53.94 | -62.25 | -45.18 |
| Al$_4$O$_6$ HOPO | -65.83 | -53.62 | -66.12 | -53.90 |

FIG. 3

ADHESION PROMOTING ADDUCTS CONTAINING METAL LIGANDS, COMPOSITIONS THEREOF, AND USES THEREOF

This application is a continuation in part of U.S. application Ser. No. 13/529,183 filed on Jun. 21, 2012, U.S. application Ser. No. 13/923,941 filed on Jun. 21, 2013, and U.S. application Ser. No. 13/923,903 filed on Jun. 21, 2013, each of which is incorporated by reference in its entirety.

FIELD

The present disclosure relates to adhesion promoting adducts containing adhesion promoting groups and metal ligands. The adhesion promoting adducts may be used as additives in polymer compositions or may be copolymerized to a sulfur-containing polymer backbone to provide improved surface adhesion to metal surfaces. Compositions including adhesion promoting adducts and sulfur-containing prepolymers useful in aerospace sealant applications are also disclosed.

BACKGROUND

Sealants useful in aerospace and other applications must satisfy demanding mechanical, chemical, and environmental requirements. The sealants can be applied to a variety of surfaces including metal surfaces, primer coatings, intermediate coatings, finished coatings, and aged coatings. Adhesion promoters are typically added to sealant formulations to enhance adhesion of the various components to each other and to the surfaces to which the sealant is applied. Ways to provide improve surface adhesion while maintaining other advantageous properties of a sealant are continuously desired.

Sulfur-containing polymers such as polythioethers and polysulfides are useful in aerospace applications. Examples of suitable polythioethers and polysulfides are disclosed, for example, in U.S. Publication Nos. 2005/0010003, 2006/0270796, 2007/0287810, 2009/0326167, and 2010/036063, each of which is incorporated by reference in its entirety.

Copolymerizable sulfur-containing adhesion promoters containing terminal adhesion promoting groups and used in sulfur-containing polymer compositions are disclosed in U.S. application Ser. No. 13/529,183. Sulfur-containing polymers having bis(sulfonyl)alkanol metal ligands incorporated into the backbone of a sulfur-containing polymer and/or as terminal groups of a sulfur-containing polymer are disclosed in U.S. application Ser. No. 13/923,903 and U.S. application Ser. No. 13/923,941.

SUMMARY

Adhesion promoting adducts useful in improving adhesion to metal surfaces are disclosed.

In a first aspect, adhesion promoting adducts comprising an adhesion promoting group and a metal ligand are provided.

In a second aspect, compositions comprising adhesion promoting adducts comprising an adhesion promoting group and a metal ligand are provided.

In a third aspect, cured sealants formed from sealant compositions comprising adhesion promoting adducts comprising an adhesion promoting group and a metal ligand are provided.

BRIEF DESCRIPTION OF THE DRAWINGS

FIG. 3 is a table showing calculated energies for the interaction of ligands with aluminum (III) surfaces described in Example 4.

Figure 1:
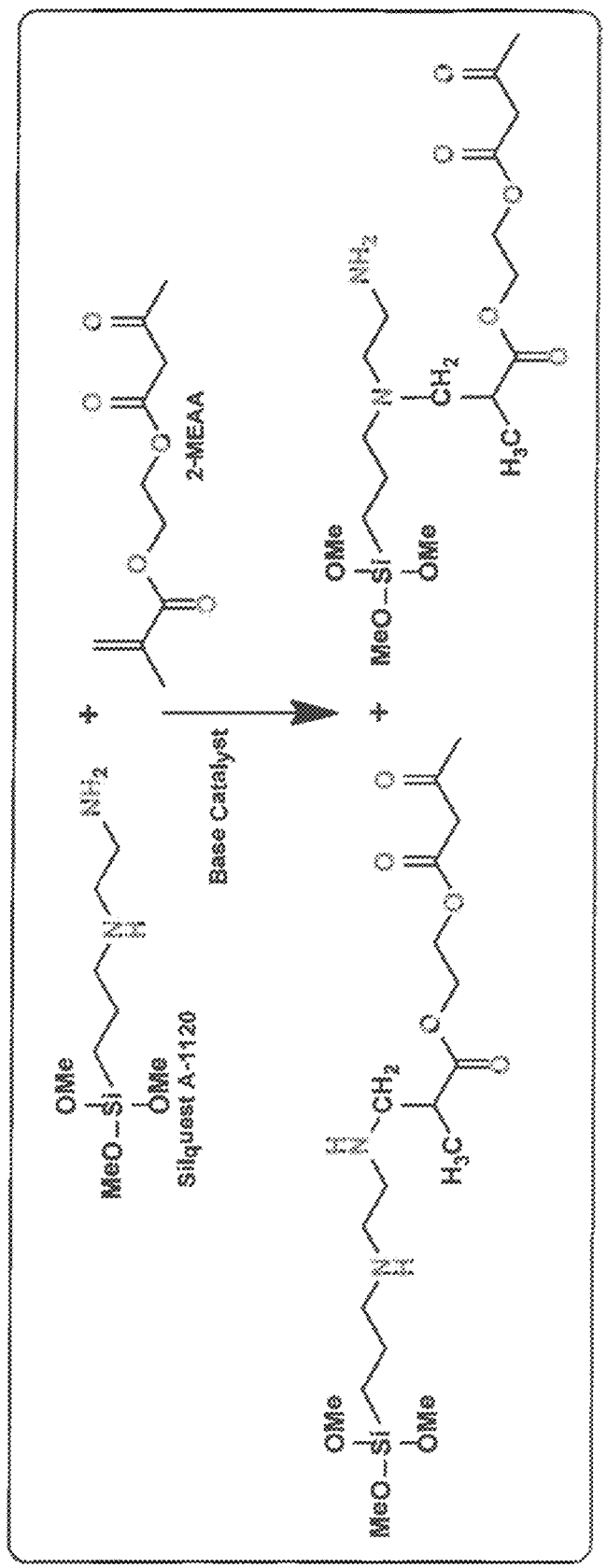
FIG. 1 illustrates the reaction described in Example 1.

Reference is now made to certain embodiments of compositions and methods. The disclosed embodiments are not intended to be limiting of the claims. To the contrary, the claims are intended to cover all alternatives, modifications, and equivalents.

DETAILED DESCRIPTION

Definitions

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the embodiments provided by the present disclosure are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("-") that is not between two letters or symbols is used to indicate a point of bonding for a substituent or between two atoms. For example, —$CONH_2$ is bonded to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1-14 carbon atoms ($C_{1-14}$), from 1-6 carbon atoms ($C_{1-6}$), from 1 to 4 carbon atoms ($C_{1-4}$), or from 1 to 3 hydrocarbon atoms ($C_{1-2}$). It can be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—CH₂CH₂CH₂CH₂CH₂CH₂—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkenyl" group refers to a group $(R)_2C=C(R)_2$ or $-RC=C(R)_2$ where the alkenyl group is a terminal group and is bonded to a larger molecule. In such embodiments, each R may be selected from, for example, hydrogen and $C_{1-3}$ alkyl. In certain embodiments, each R is hydrogen and an alkenyl group has the structure —CH=CH₂.

"Alkoxy" refers to a —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. In certain embodiments, the alkyl group is $C_{2-6}$ alkyl, $C_{2-4}$ alkyl, and in certain embodiments, $C_{2-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{2-6}$ alkyl, $C_{2-4}$ alkyl, and in certain embodiments, $C_{2-3}$ alkyl. It can be appreciated that a branched alkyl group has a minimum of three carbon atoms.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Bis(sulfonyl)alkanol group" refers to a group having the general Formula (1):

$$-S(O)_2-R^{10}-CH(-OH)-R^{10}-S(O)_2- \quad (1)$$

where each $R^{10}$ is independently selected from $C_{1-3}$ alkanediyl and substituted $C_{1-3}$ alkanediyl, where the one or more substituent groups is —OH. In certain embodiments, a bis(sulfonyl)alkanol group has the structure —CH₂—CH₂—S(O)₂—R¹⁰—CH(—OH)—R¹⁰—S(O)₂—CH₂—CH₂— and in certain embodiments, the structure, —R⁹—S(O)₂—R¹⁰—CH(—OH)—R¹⁰—S(O)₂—R⁹— where each R⁹ is an organic moiety; and each R¹⁰ is independently selected from $C_{1-3}$ alkanediyl and substituted $C_{1-3}$ alkanediyl, wherein the one or more substituent groups is —OH.

In certain embodiments, a "bis(sulfonyl)alkanol group" can be a monovalent bis(sulfonyl)alkanol group or a divalent bis(sulfonyl)alkanol group. In certain embodiments, a monovalent bis(sulfonyl)alkanol can be a terminal bis(sulfonyl)alkanol group such as a "1-(ethylenesulfonyl)-n-(vinylsulfonyl)alkanol group." A terminal bis(sulfonyl)alkanol group can be derived from the reaction of a bis(sulfonyl)alkanol and can have a terminal moiety with the general structure —R⁹—S(O)₂—R¹⁰—CH(—OH)—R¹⁰—S(O)₂—R⁸ where R⁹ is a moiety derived from the reaction of a bis(sulfonyl)alkanol with a compound having a group reactive with the bis(sulfonyl)alkanol; each R¹⁰ is independently selected from $C_{1-3}$ alkanediyl, and substituted $C_{1-3}$ alkanediyl, wherein the one or more substituent groups is —OH. In certain embodiments, R⁸ is —CH=CH₂. In certain embodiments, a terminal bis(sulfonyl)alkanol group is a 1-(ethylenesulfonyl)-n-(vinylsulfonyl)alkanol group such as 1-(ethylenesulfonyl)-3-(vinylsulfonyl)propan-2-ol, i.e., —CH₂—CH₂—S(O)₂—CH₂—CH(—OH)—CH₂—S(O)₂—CH=CH₂. In certain embodiments, a terminal bis(sulfonyl)alkanol group has the structure —CH₂—CH₂—S(O)₂—R¹⁵—CH(—OH)—R¹⁵—S(O)₂—CH=CH₂.

In certain embodiments, a bis(sulfonyl)alkanol group can also be divalent such as when the group is incorporated into the backbone of a prepolymer such as the polythioethers disclosed in U.S. application Ser. No. 13/923,903. In certain embodiments, a divalent bis(sulfonyl)alkanol group can have the general structure —R⁹—S(O)₂—R¹⁵—CH(—OH)—R¹⁵—S(O)₂—R⁹—; in certain embodiments, —CH₂—CH₂—S(O)₂—R¹⁵—CH(—OH)—R¹⁵—S(O)₂—CH₂—CH₂—, in certain embodiments, —R⁹—S(O)₂—CH₂—CH(—OH)—CH₂—S(O)₂—R⁹—, and in certain embodiments, —CH₂—CH₂—S(O)₂—CH₂—CH(—OH)—CH₂—S(O)₂—CH₂—CH₂—, where R⁹ and R¹⁵ are as defined herein. In certain embodiments of a bis(sulfonyl)alkanol, each R⁹ is an ethane-diyl group and/or each R¹⁵ is methanediyl.

A "bis(sulfonyl)alkanol" refers to a compound of the general formula R⁸—S(O)₂—R¹⁵—CH(—OH)—R¹⁵—S(O)₂—R⁸ where each R⁸ is a moiety having a terminal reactive group; and each R¹⁰ is independently selected from $C_{1-3}$ alkanediyl and substituted $C_{1-3}$ alkanediyl, wherein the one or more substituent groups is —OH. In certain embodiments, each R⁸ comprises a terminal group reactive with a thiol group such as, for example, an alkenyl group, an epoxy group, a Michael acceptor group, or a group comprising a saturated carbon bearing a leaving group that are well suited for nucleophilic substitution such as, for example, —Cl, —Br, —I, —OSO₂CH₃ (mesylate), —OSO₂—C₆H₄—CH₃ (tosylate), etc. In certain embodiments, a bis(sulfonyl)alkanol may be a bis(vinylsulfonyl)alkanol comprising terminal alkenyl groups. In certain embodiments a bis(sulfonyl)alkanol may be a bis(vinylsulfonyl)alkanol in which R⁸ comprises a terminal alkenyl group, such as a compound having the formula CH₂=CH—S(O)₂—R¹⁵—CH(—OH)—R¹⁵—S(O)₂—CH=CH₂. In certain embodiments, a bis(vinylsulfonyl)alkanol is 1,3-bis(vinylsulfonyl)-2-propanol. In certain embodiments, a bis(sulfonyl)alkanol containing compound can be prepared by reacting a bis(vinylsulfonyl)alkanol with a compound having a reactive terminal functional group and a terminal group reactive with the terminal alkenyl groups of the bis(vinylsulfonyl)alkanol such as a thiol group or an epoxy group. In such embodiments, the bis(sulfonyl)alkanol can have the structure $R^9$—$CH_2$—$CH_2$—$S(O)_2$—$R^{15}$—CH(—OH)—$R^{15}$—$S(O)_2$—$CH_2$—$CH_2$—$R^9$ where each $R^9$ is a moiety derived from the reaction of the compound with the terminal alkenyl groups of the bis(vinylsulfonyl)alkanol.

A "bis(sulfonyl)alkanol-containing" polymer, prepolymer, or adduct refers to polymer, prepolymer, or adduct in which one or more divalent bis(sulfonyl)alkanol groups are incorporated into the backbone of the polymer, prepolymer, or adduct.

A divalent bis(sulfonyl)alkanol group can be incorporated in a prepolymer by reacting, for example, in a suitable ratio, a polythiol monomer or prepolymer of Formula (2) with a bis(sulfonyl)alkanol of Formula (3):

$$R(\text{—SH})_w \qquad (2)$$

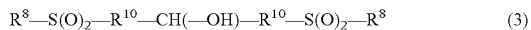

$$R^8\text{—}S(O)_2\text{—}R^{10}\text{—}CH(\text{—OH})\text{—}R^{10}\text{—}S(O)_2\text{—}R^8 \qquad (3)$$

where R is an organic moiety, w is an integer of at least 2 and each $R^8$ comprises a terminal group that is reactive with a thiol group such as, for example, an alkenyl group, and epoxy group, or a group comprising a saturated carbon bearing a leaving group that are well suited for nucleophilic substitution such as, for example, —Cl, —Br, —I, —$OSO_2CH_3$ (mesylate), —$OSO_2$—$C_6H_4$—$CH_3$ (tosylate), etc. In certain embodiments, a bis(sulfonyl)alkanol of Formula (3) may be a bis(vinylsulfonyl)alkanol having the structure of Formula (4):

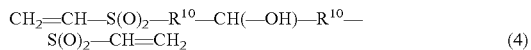

$$CH_2\text{=}CH\text{—}S(O)_2\text{—}R^{10}\text{—}CH(\text{—OH})\text{—}R^{10}\text{—}S(O)_2\text{—}CH\text{=}CH_2 \qquad (4)$$

where each $R^{10}$ is independently selected from $C_{1-3}$ alkanediyl and substituted $C_{1-3}$ alkanediyl, wherein the one or more substituent groups is —OH. In certain embodiments, a bis(sulfonyl)alkanol may be 1,3-bis(vinylsulfonyl)-2-propanol. Alternatively, a bis(sulfonyl)alkanol group can be incorporated into a prepolymer backbone by reacting, in a suitable ratio, a thiol-capped bis(sulfonyl)alkanol of Formula (5) with a reactant of Formula (6):

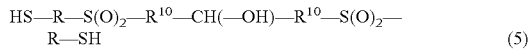

$$HS\text{—}R\text{—}S(O)_2\text{—}R^{10}\text{—}CH(\text{—OH})\text{—}R^{10}\text{—}S(O)_2\text{—}R\text{—}SH \qquad (5)$$

$$R^{21}\text{—}R^{20}\text{—}R^{21} \qquad (6)$$

where each $R^{20}$ is a divalent moiety, each $R^{10}$ is as defined herein, and each $R^{21}$ comprises a terminal group that is reactive with a thiol group such as, for example, an alkenyl group, an epoxy group, or a group consisting of a saturated carbon bearing a leaving group that are well known for nucleophilic substitution such as, for example, —Cl, —Br, —I, —$OSO_2CH_3$ (mesylate), —$OSO_2$—$C_6H_4$—$CH_3$ (tosylate), etc.

By choosing the appropriate ratio of the reactants of Formula (2) and Formula (3), or of Formula (5) and Formula (6), one or more bis(sulfonyl)alkanol groups can be incorporated into a prepolymer as either a chain segment, as part of a terminal bearing a reactive group, or both. For example, bis (vinylsulfonyl)alkanol can be used to introduce one or more 1,n-bis(ethylenesulfonyl)alkanol groups into the backbone of a prepolymer chain, one or more terminal 1-(ethylenesulfonyl)-n-(vinylsulfonyl)alkanol groups, or both.

In certain embodiments, bis(vinylsulfonyl)-2-propanol can be reacted with thiol-capped monomers/polymers to incorporate 1,3-bis(ethylenesulfonyl)-2-propanol groups into the polymer chain.

In certain embodiments, bis(vinylsulfonyl)-2-propanol can be reacted with thiol-capped monomers/polymers to provide 1-(ethylenesulfonyl)-3-(vinylsulfonyl)-2-propanol terminal groups, where the terminal alkenyl group is a well-recognized Michael acceptor.

A moiety derived from the reaction of a bis(sulfonyl)alkanol with a thiol group refers to the reaction product a thiol group and a moiety containing a terminal group reactive with the thiol group. Examples of terminal groups reactive with thiol groups include epoxy groups, alkenyl groups, Michael acceptor groups, and groups comprising a saturated carbon bearing a leaving group that are well suited for nucleophilic substitution such as, for example, —Cl, —Br, —I, —$OSO_2CH_3$ (mesylate), —$OSO_2$—$C_6H_4$—$CH_3$ (tosylate), etc. In certain embodiments, a moiety derived from the reaction of a bis(sulfonyl)alkanol with a thiol group has the structure: —$CH_2$—$CH_2$—R—, —CH(—OH)—$CH_2$—R—, —$CH_2$—CH(—OH)—R—, or —$CH_2$—$CH_2$—$SO_2$—R—, where R refers to a covalent bond or an organic moiety bonded to a sulfonyl group.

A moiety derived from the reaction of a bis(sulfonyl)alkanol with a thiol group also refers to a moiety $R^9$, which is derived from the reaction of group $R^8$ with a thiol group, where $R^8$ comprises a terminal group reactive with a thiol group.

In certain embodiments, $R^9$ is derived from the reaction of a bis(sulfonyl)alkanol with a compound having a terminal group reactive with a thiol group and a group reactive with a bis(sulfonyl)alkanol. In certain embodiments $R^9$ is derived from the reaction of a bis(vinylsulfonyl)alkanol with a compound having a terminal group reactive with a thiol group and a group reactive with an alkenyl group. In such embodiment, $R^9$ may have the structure: —$CH_2$—$CH_2$—R'—$CH_2$—$CH_2$—, —CH(—OH)—$CH_2$—R'—$CH_2$—$CH_2$—, —$CH_2$—CH(—OH)—R'—$CH_2$—$CH_2$—, or —$CH_2$—$CH_2$—$SO_2$—R'—$CH_2$—$CH_2$—, where R' is an organic moiety derived from the reaction of the compound used to cap the bis(ethylenesulfonyl)alkanol with a functional group such as an alkenyl group, an epoxy group, a Michael acceptor group, or a group comprising a saturated carbon bearing a leaving group that are well suited for nucleophilic substitution such as, for example, —Cl, —Br, —I, —$OSO_2CH_3$ (mesylate), —$OSO_2$—$C_6H_4$—$CH_3$ (tosylate), etc.

In certain embodiments, $R^9$ is selected from $C_{2-10}$ alkanediyl, substituted $C_{2-10}$ alkanediyl, $C_{2-10}$ heteroalkanediyl, substituted $C_{2-10}$ heteroalkanediyl, $C_{4-14}$ alkanecycloalkanediyl, substituted $C_{4-14}$ alkanecycloalkanediyl, $C_{4-14}$ heteroalkanecycloalkanediyl, substituted $C_{4-14}$ heteroalkanecycloalkanediyl, $C_{4-14}$ alkanearenediyl, substituted $C_{4-14}$ alkanearenediyl, $C_{4-14}$ heteroalkanearenediyl, and substituted $C_{4-14}$ heteroalkanearenediyl. In certain embodiments, $R^9$ is ethane-diyl.

In certain embodiments, $R^9$ is selected from $C_{2-10}$ alkyl, substituted $C_{2-10}$ alkyl, $C_{2-10}$ heteroalkyl, substituted $C_{2-10}$ heteroalkyl, $C_{4-14}$ alkanecycloalkyl, substituted $C_{4-14}$ alkanecycloalkyl, $C_{4-14}$ heteroalkanecycloalkyl, substituted $C_{4-14}$ heteroalkanecycloalkyl, $C_{4-14}$ alkanearyl, substituted $C_{4-14}$ alkanearyl, $C_{4-14}$ heteroalkanearyl, and substituted $C_{4-14}$ heteroalkanearyl. In certain embodiments, $R^8$ is ethylene, i.e., —CH=$CH_2$.

An "acetylacetonate group" refers to a group having the structure of Formula (1):

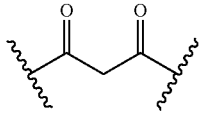
(1)

In certain embodiments, an acetylacetonate refers to a metal chelating agent comprising an acetylacetonate group and one or more reactive functional groups.

"Hydroxypyridinone groups" comprise groups such as 3-hydroxy-4-pyridinone and 3-hydroxy-2-pyridinone having the structure of Formula (8a) or Formula (8b), respectively:

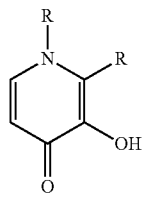
(8a)

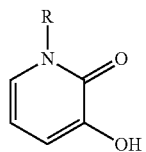
(8b)

where R is an organic groups such as an alkyl group. A hydroxypyridinone metal chelating agent comprises a hydroxypyridinone group and one or more reactive functional groups such as terminal thiol groups.

"Quinones" refer to compounds having a fully conjugated cyclic dione structure derived from aromatic compounds by conversion of an even number of —CH= groups into —C(=O)— groups with any necessary rearrangement of double bonds. Examples of quinones include 1,2-benzoquinone, 1,4-benzoquinone, 1,4-naphthaloquinone, and 9,10-anthraquinone. Quinone groups can be metal ligands.

A "metal ligand" refers to an ion or molecule that binds to a metal atom and potentially other atoms to form a coordination complex. The bonding between the metal and or atoms generally involves donation of one or more electron pairs to the metal and the nature of the bonding can be, for example, covalent, ionic, or by hydrogen bonding. Metal ligands provided by the present disclosure are capable of forming coordination complexes to aerospace surfaces such as aluminum and titanium surfaces, which may be oxidized. In the case of oxidized surfaces a metal ligand may form a coordination complex with a metal such as Al(III) and oxygen atoms. The coordination complex can enhance the adhesion to the metal or oxidized metal surface.

Metal ligands may be incorporated into the backbone of a prepolymer as provided by the present disclosure. In addition to a moiety capable of forming a coordination complex, for incorporation into a prepolymer backbone, the metal ligand will comprise, or will be derivatized to comprise at least two groups that are reactive with a group of a subunit of a prepolymer. Such reactive metal ligands may be commercially available or may be derivatized to include appropriate reactive substituent groups using methods known to those skilled in the art.

"Heteroalkanediyl" refers to an alkanediyl group in which one or more of the carbon atoms are replaced with a heteroatom, such as N, O, S, or P. In certain embodiments of heteroalkanediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

A "Michael acceptor" refers to an activated alkene, such as an alkenyl group proximate to an electron-withdrawing group such as a ketone, nitro, halo, nitrile, carbonyl, or nitro group. Michael acceptors are well known in the art. A "Michael acceptor group" refers to an activated alkenyl group and an electron-withdrawing group. In certain embodiments, a Michael acceptor group is selected from a vinyl ketone, a vinyl sulfone, a quinone, an enamine, a ketimine, an aldimine, an oxazolidine, and an acrylate. Other examples of Michael acceptors are disclosed in Mather et al., Prog. Polym. Sci., 2006, 31, 487-531, and include acrylate esters, acrylonitrile, acrylamides, maleimides, alkyl methacrylates, cyanoacrylates. Other Michael acceptors include vinyl ketones, α,β-unsaturated aldehydes, vinyl phosphonates, acrylonitrile, vinyl pyridines, certain azo compounds, β-keto acetylenes and acetylene esters. In certain embodiments, a Michael acceptor group is derived from a vinyl ketone and has the structure of the formula $-S(O)_2-C(R)_2=CH_2$, where each R is independently selected from hydrogen, fluorine, and $C_{1-3}$ alkyl. In certain embodiments, each R is hydrogen. In certain embodiments, a Michael acceptor or Michael acceptor group does not encompass acrylates. A "Michael acceptor compound" refers to a compound comprising at least one Michael acceptor. In certain embodiments, a Michael acceptor compound is divinyl sulfone, and a Michael acceptor group is vinylsulfonyl, e.g., $-S(O)_2-CH_2=CH_2$.

A "Michael acceptor" refers to substituted alkene/alkyne compounds in which at least one alkene/alkyne group is directly attached to one or more electron-withdrawing group such as carbonyl (—CO), nitro (—NO₂), nitrile (—CN), alkoxycarbonyl (—COOR), phosphonate (—PO(OR)₂), trifluoromethyl (—CF₃), sulfonyl (—SO₂—), trifluormethanesulfonyl (—SO₂CF₃), p-toluenesulfonyl (—SO₂—C₆H₄—CH₃), etc. Types of compounds that function as Michael acceptors are vinyl ketones, quinones, nitroalkenes, acrylonitriles, acrylates, methacrylates, cyanoacrylates, acrylamides, maleimides, dialkyl vinylphosphonate, and vinylsulfones. Other examples of Michael acceptors are disclosed in Mather et al., Prog. Polym. Sci. 2006, 31, 487-531. Michael acceptor compounds having more than one Michael acceptor group are also well known. Examples include diacrylates such as ethylene glycol diacrylate and diethylene glycol diacrylate, dimethacrylates such as ethylene glycol methacrylate and diethylene glycol methacrylate, bismaleimides such as N,N'-(1,3-phenylene)dimaleimide and 1,1'-(methylenedi-4,1-phenylene)bismaleimide, vinylsulfones such as divinyl sulfone and 1,3-bis(vinylsulfonyl)-2-propanol, etc. In certain embodiments, a Michael acceptor group has the structure of Formula (9a) or Formula (9b):

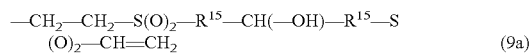
(9a)

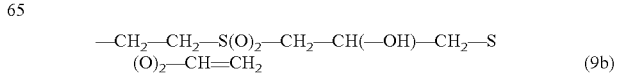
(9b)

where each $R^{15}$ is independently selected from $C_{1-3}$ alkanediyl and substituted $C_{1-3}$ alkanediyl, wherein the one or more substituent groups is —OH.

A "Michael acceptor compound" refers to a compound comprising at least one terminal Michael acceptor group. In certain embodiments, a Michael acceptor compound is divinyl sulfone, and a Michael acceptor group is vinylsulfonyl, i.e., —S(O)$_2$—CH=CH$_2$. In certain embodiments, a Michael acceptor compound is a bis(vinylsulfonyl)alkanol, and a Michael acceptor group is 1-(ethylenesulfonyl)-n-(vinylsulfonyl)alkanol, i.e., —CH$_2$—CH$_2$—S(O)$_2$—R$^{10}$—CH(—OH)—R$^{10}$—S(O)$_2$—CH=CH$_2$, and in certain embodiments, 1-(ethylenesulfonyl)-3-(vinylsulfonyl)propan-2-ol (—CH$_2$—CH$_2$—S(O)$_2$—CH$_2$—CH(—OH)—CH$_2$—S(O)$_2$—CH=CH$_2$).

A "polyalkoxysilyl group" refers to a group having the structure of Formula (10):

$$-\text{Si}(-R^7)_p(-OR^7)_{3-p} \tag{10}$$

where p is selected from 0, 1, and 2; and each $R^7$ is independently selected from $C_{1-4}$ alkyl. In certain embodiments of a polyalkoxysilyl group, p is 0, p is 1, and in certain embodiments, p is 2. In certain embodiments of a polyalkoxysilyl group, each $R^7$ is independently selected from ethyl and methyl. In certain embodiments of a polyalkoxysilyl group, each $R^7$ is ethyl, and in certain embodiments, each $R^7$ is methyl. In certain embodiments of a polyalkoxysilyl group, the group is selected from —Si(—OCH$_2$CH$_3$)$_3$, —Si(—OCH$_3$)$_3$, —Si(—CH$_3$)(—OCH$_3$)$_2$, —Si(—CH$_3$)$_2$(—OCH$_3$), —Si(—CH$_3$)(—OCH$_2$CH$_3$)$_2$, —Si(—CH$_3$)$_2$(—OCH$_2$CH$_3$), —Si(—CH$_2$CH$_3$)(—OCH$_3$), and —Si(—CH$_2$CH$_3$)$_2$(—OCH$_3$).

A "polyalkoxysilane" refers to a compound comprising a polyalkoxysilyl group. Polyalkoxysilyl groups are adhesion promoting groups and therefore polyalkoxysilanes are adhesion promoters. In certain embodiments, a polyalkoxysilane has the formula $R^{11}$—P—$R^{12}$ where P is the core of the polyalkoxysilane, $R^{11}$ comprises a polyalkoxysilyl group, and $R^{12}$ comprises a reactive functional group.

As used herein, "polymer" refers to oligomers, homopolymers, and copolymers. Unless stated otherwise, molecular weights are number average molecular weights for polymeric materials indicated as "Mn" as determined, for example, by gel permeation chromatography using a polystyrene standard in an art-recognized manner. The term "prepolymer" is also used to refer to polymeric components of a composition that when cured form a cured polymer.

"Substituted" refers to a group in which one or more hydrogen atoms are each independently replaced with the same or different substituent(s). In certain embodiments, the substituent is selected from halogen, —S(O)$_2$OH, —S(O)$_2$, —SH, —SR where R is $C_{1-6}$ alkyl, —COOH, —NO$_2$, —NR$_2$ where each R is independently selected from hydrogen and $C_{1-3}$ alkyl, —CN, —C=O, $C_{1-6}$ alkyl, —CF$_3$, —OH, phenyl, $C_{2-6}$ heteroalkyl, $C_{5-6}$ heteroaryl, $C_{1-6}$ alkoxy, and —COR where R is $C_{1-6}$ alkyl. In certain embodiments, the substituent is chosen from —OH, —NH$_2$, and $C_{1-3}$ alkyl.

Reference is now made to certain embodiments of adhesion promoting adducts, prepolymers, compositions, and methods. The disclosed embodiments are not intended to be limiting of the claims. To the contrary, the claims are intended to cover all alternatives, modifications, and equivalents.

Adhesion Promoting Adducts

Adhesion promoting adducts provided by the present disclosure include an adhesion promoting group and a metal ligand.

Groups that promote adhesion to metal surfaces are well-known in the art. Examples of groups that promote adhesion include polyalkoxysilyl groups, phosphonate groups, amine groups, including primary and secondary amines, carboxylic acid groups, and phosphonic acid groups.

In certain embodiments, an adhesion promoting group may be a polyalkoxysilyl group, which may have the structure —Si(R$^4$)$_{y1}$(OR$^5$)$_{y2}$ wherein y1 is selected from 0, 1, and 2; y2 is selected from 1, 2, and 3; and the sum of y1 and y2 is 3; each $R^4$ is independently selected from $C_{1-4}$ alkyl; and each $R^5$ is independently $C_{1-4}$ alkyl.

In certain embodiments, an adhesion promoting group may be a phosphonate group, which may have the structure —P(=O)(OR$^6$)$_2$ wherein each $R^6$ is independently selected from $C_{1-4}$ alkyl. In certain embodiments, an adhesion promoting group may be a phosphonic acid group, which has the structure —P(=O)(OR$^6$)$_2$ wherein each $R^6$ is hydrogen.

In certain embodiments, an adhesion promoting group may be a primary amine, and in certain embodiments, a secondary amine.

In certain embodiments, an adhesion promoting group may be a carboxylic acid group.

Typical aerospace vehicle surfaces include, for example, aluminum, anodized aluminum, Al(III), Alodine®, and titanium. Thus, for use in aerospace sealant applications, it is desirable that a metal chelating agent coordinate with aluminum, aluminum oxide, Alodine®, titanium, and titanium oxide. Thus, in certain embodiments, a metal ligand comprises a moiety capable of forming a coordination complex to one of or more of these aerospace surfaces. In addition to forming a coordination complex with a metal, other transition metals or elements such as oxygen may be involved in the coordination complex either through covalent, ionic, or hydrogen bonding interactions. For application to other surfaces, an appropriate metal ligand can be selected.

Metal ligands and in particular aluminum (III) metal ligands include hard Lewis bases such as —OH, —PO$_4$, —SO$_4$, —COOH, —C=O, and —NH$_2$ groups, which are capable of coordinating with the metal or oxidized metal such as aluminum (III). Basic donor groups effective in forming multidentate coordination complexes with aluminum (III) include aliphatic monohydroxy acid anions, catecholates, aromatic hydroxy acid anions, 3-hydroxy-4-pyridinones, hydroxamates, and 3-hydroxy-2-pyridinones. Stable aluminum (III) complexes are with multidentate ligands having negative oxygen electron donors. A metal ligand may form a multidentate complex such as a bidentate complex or a tridentate complex with the metal.

In certain embodiments, a metal ligand functional group is derived from a metal chelating agent selected from a bis(sulfonyl)alkanol, a benzoquinone, a hydroxypyridinone, and an acetylacetonate.

Examples of aluminum, aluminum oxide, and/or Al(III) ligands include 2,3-dihydroxybenzoic acid, 5-nitrosalicylate, 3-hydroxy-4-pyridinone, 3-hydroxy-2-pyridinone, 2-2'-dihyrdroxyazobenzene, 8-hydroxyquinoline, oxylate, malonate, citrate, inimodiacetic acid, picolinic acid, maltol, kojic acid, N,N'-diacetic acid (EDTA), N-(2-hydroxy)ethylenediamenetriacetic acid (HEDTA), ethylenediamine-N,N'-bis(2-hydroxyphenylacetic acid (EDDHA), and N,N'-bis(hydroxybenzyl)ethylenediamine-N,N'-diacetic acid (HBED), acetoacetate, and quinone. Other aluminum and aluminum oxide chelators are disclosed, for example, in Yokel, *Coordination Chemistry Reviews* 2002, 228, 97-113; and Martell et al., *Coordination Chemistry Reviews* 1996, 149, 311-328.

Examples of titanium or titanium oxide ligands include H$_2$O$_2$, acetoacetonate (CH$_2$(COCH$_3$)$_2$), EDTA, trans-1,2-cyclohexanediamne tetraacetic acid, glycoletherdiamine tetracetic acid (GEDTA, (CH$_2$OCH$_2$CH$_2$N(CH$_2$COOH)$_2$)$_2$), diethylenetriamine pentaacetic acid (DTPA, HOOCH$_2$N (CH$_2$CH$_2$N(CH$_2$COOH)$_2$)$_2$), nitrile triacetic acid (NTA, N(CH$_2$COOH)$_3$), salicylic acid, lactic acid, acetylacetonate, triethanolamine, and a combination of any of the foregoing.

In certain embodiments, a metal ligand comprises at least two heteroatomic groups capable of coordinating to aluminum (III). In certain embodiments, a metal ligand comprises at least two heteroatomic groups selected from —OH, —PO$_4$, —P(O)$_2$—, —SO$_4$, —S(O)$_2$—, —COOH, —C═O, —NH$_2$, —NH—, and a combination of any of the foregoing.

In U.S. application Ser. Nos. 13/923,903 and 13/923,941 Cai et al. disclose bis(sulfonyl)alkanol groups combined with sulfur-containing polymers to improve the surface adhesion of cured compositions to aerospace surfaces. Bis(sulfonyl) alkanol groups can have the structure of Formula (11a) or Formula (11b):

$$-S(O)_2-R^{15}-CH(-OH)-R^{15}-S(O)_2- \quad (11a)$$

$$-S(O)_2-CH_2-CH(-OH)-CH_2-S(O)_2- \quad (11b)$$

where each R$^{15}$ is independently selected from C$_{1-3}$ alkanediyl and substituted C$_{1-3}$ alkanediyl, where the one or more substituents is —OH.

In certain embodiments a metal ligand comprises a structure of Formula (12a), Formula (12b), Formula (12c), Formula (12d), Formula (12e), and a combination of any of the foregoing:

$$-X-(CH_2)_n-CH(-OH)- \quad (12a)$$

$$-X-(CH_2)_n-CH(-OH)-(CH_2)_n-X- \quad (12b)$$

$$-CH(-OH)-(CH_2)_n-X-(CH_2)_n-CH(-OH)- \quad (12c)$$

$$-CH(-OH)-R^5-CH(-OH)- \quad (12d)$$

$$-C(O)-R^5-C(O)- \quad (12e)$$

wherein each X is independently selected from —C(O)— and —S(O)$_2$—; n is an integer from 1 to 3; and R$^5$ is C$_{1-4}$ alkanediyl.

In certain embodiments, a metal ligand comprises a bis(sulfonyl)alkanol, a hydroxypyridinone, a quinone, an acetylacetonate, or a combination of any of the foregoing.

Adhesion promoting adducts provided by the present disclosure may also contain a reactive group that is reactive with a polyfunctionalizing agent or with a functional group of a prepolymer. For example, the reactive group may be reactive with a terminal group of a polyfunctionalizing agent and used to prepare a polyvalent adhesion promoting adduct, a copolymerizable adhesion promoting adduct, or a copolymerizable sulfur-containing adhesion promoting adduct as disclosed herein. In other embodiments, the reactive group may be reactive with a functional group of a multifunctional sulfur-containing prepolymer such as a polythioether or a polysulfide, and/or may be reactive with a curing agent. In either case, the reactive group can be useful for grafting the adhesion promoting adduct to the backbone of a cured polymer, which is useful for improving the adhesion strength of a composition.

In certain embodiments, an adhesion promoting adduct comprises the reaction product of reactants comprising an adhesion promoter comprising an adhesion promoting group and a functional group, and a metal chelating agent comprising a metal ligand and a functional group reactive with the functional group of the adhesion promoter. For example, in certain embodiments, an adhesion promoting adduct comprises the reaction product of reactants comprising an adhesion promoter of formula R$^{11}$—P—R$^{12}$ and a metal chelating agent of formula R$^{13}$-M-R$^{14}$, where R$^{11}$ comprises an adhesion promoting group, P comprises a core of an adhesion promoter, M comprises a metal ligand, R$^{12}$ and R$^{13}$ comprise mutually reactive functional groups, and R$^{14}$ is selected from a non-reactive group, a reactive functional group, or is absent.

In certain embodiments, an adhesion promoting adduct has a structure of Formula (13):

$$R^{11}-P-R^{12'}-R^{13'}-M-R^{14} \quad (13)$$

wherein,
R$^{11}$ comprises an adhesion promoting group;
P comprises a core of an adhesion promoter;
M comprises a metal ligand;
R$^{12'}$ and R$^{13'}$ represent moieties derived from the reaction of R$^{12}$ and R$^{13}$ of an adhesion promoter R$^{11}$—P—R$^{12}$ and a metal chelating agent R$^{13}$-M-R$^{14}$, wherein R$^{12}$ and R$^{13}$ comprise mutually reactive functional groups, and R$^{14}$ is selected from a non-reactive group, a reactive functional group, or is absent.

Appropriate reaction conditions for reacting the adhesion promoter and the metal chelating agent to provide an adhesion promoting adduct can be determined by one skilled in the art.

In certain embodiments, an adhesion promoter comprises an alkenyl group, a thiol group or an amine group that is reactive with a group of the metal chelating agent. In certain embodiments, an adhesion promoter comprises a thiol-terminate polyalkoxysilane.

In certain embodiments, an adhesion promoter comprises a mercaptosilane and in certain embodiments, an aminosilane. Examples of polyalkoxysilyl-containing adhesion promoters having a reactive amine or thiol group include amine-functional adhesion promoters such as N-(β-aminoethyl)γ-aminopropyltrimethoxysilane (Silquest® A-1120) and thiol-functional adhesion promoters such as γ-mercaptopropyltrimethoxysilane (Silquest® A-189).

In certain embodiments, an adhesion promoter has a structure of Formula (14a), a structure of Formula (14b), a structure of Formula (14c), or a combination of any of the foregoing:

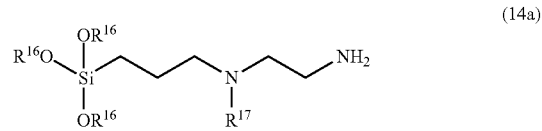
(14a)

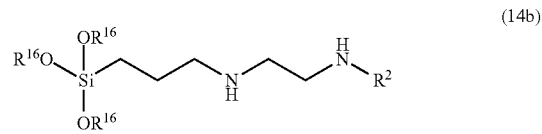
(14b)

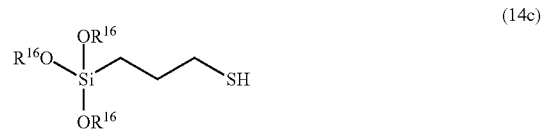
(14c)

wherein each R$^{16}$ is independently selected from C$_{1-3}$ alkyl, and each R$^{17}$ is selected from hydrogen and C$_{1-3}$ alkyl.

In certain embodiments, a metal chelating agent comprises an aluminum or aluminum oxide chelating agent and is selected from a bis(sulfonyl)alkanol, a quinone, an acetylacetonate, a hydroxypyridinone, and a combination of any of the foregoing. Specific, examples of aluminum chelating agents include acetylacetonates such as 2-(methylacyrloyloxy)ethyl acetoacetate (2-MEAA), hydroxypyridinones such as 3-hydroxy-4-pyridinone and 3-hydroxy-2-pyridinone, and bis(sulfonyl)alkanols such as bis(vinylsulfonyl)-2-propanol.

In certain embodiments, a thiol-terminated adhesion promoter such as γ-mercaptopropyltrimethoxysilane may be reacted with a bis(sulfonyl)alkanol such as 1,3-bis(vinylsulfonyl)-2-propanol to provide a adhesion promoting adduct of Formula (15):

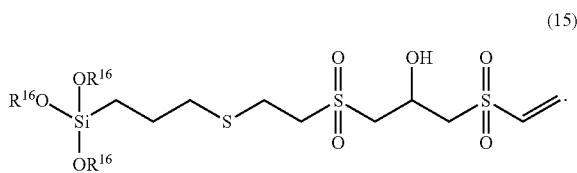

(15)

wherein each $R^{16}$ is independently selected from methyl and ethyl.

As another example, an amine-functional adhesion promoting adduct such as N-(β-aminoethyl)γ-aminopropyltrimethoxy-silane may be reacted with an acrylate- or benzoquinone-containing metal chelating agent such as 2-(methacryloyloxy)ethyl acetoacetate (2-MEAA) or benzoquinone (cannot produce this structure directly) to provide adhesion promoting adducts having the structures of Formula (16a)-(16d).

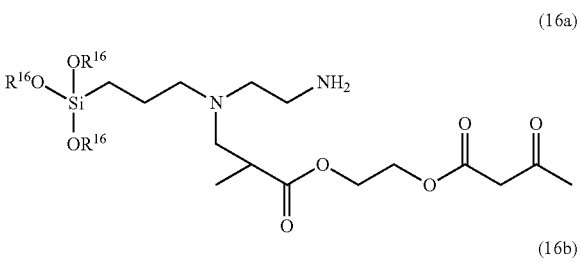

(16a)

(16b)

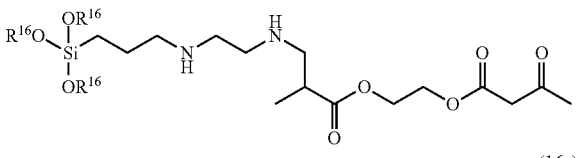

(16c)

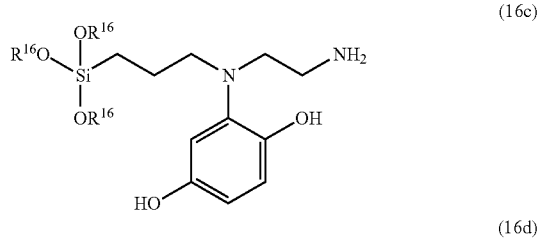

(16d)

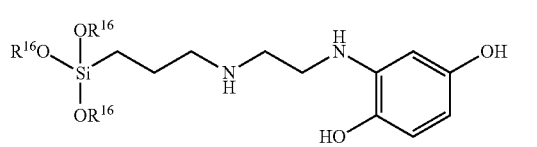

where each $R^{16}$ is independently selected from methyl and ethyl.

As can be appreciated from these examples, the mutually reactive functional groups of the adhesion promoter and the metal chelating agent may be terminal functional groups or may comprise the core of the adhesion promoter or metal chelating agent. Thus, in certain embodiments, the moieties —P— and -M- may comprise one or more reactive functional groups.

Extended Adhesion Promoting Adducts

In certain embodiments, an adhesion promoting adduct comprises one or more reactive functional groups. These reactive functional groups may be reacted with another compound to form an extended adhesion promoting adduct. For example, in certain embodiments an adhesion promoting adduct comprises the reaction products of reactants comprising an adhesion promoting adduct, comprising a first reactive functional group, such as the adhesion promoting adduct of Formula (13); and a compound having a second reactive functional group reactive with the first reactive functional group.

In certain embodiments, the adhesion promoting adduct may be reacted with a polyamine such as a diamine, or a polythiol such as a dithiol.

In certain embodiments, a compound having a functional group reactive with an adhesion promoting adduct may have the structure of Formula (17):

$$R^{31}-R^{30}-R^{31} \qquad (17)$$

where,
each $R^{31}$ is selected from a functional group reactive with the adhesion promoting adduct such as —NH$_2$, —SH or —CH=CH$_2$; and
each $R^{30}$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^6$)$_s$—X—]$_q$—(CHR$^6$)$_r$—;
wherein:
each $R^6$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10;

Examples of extended adhesion promoting adducts include the reaction product of the adhesion promoting adduct of Formula (13) and the compound of Formula (17) is 3,3'-((oxybis(ethane-2,1-diyl))bis(oxy))bis(propan-1-amine), 2,2'-thiodiethanethiol, or 2,2'-oxydiethanethiol.

In other embodiments, an adhesion promoting adduct may be reacted with a reactive functional group of a prepolymer to provide an adhesion promoting adduct-functional or -terminated prepolymer. In certain embodiments, the prepolymer may be a sulfur-containing prepolymer such as any of those disclosed herein including polythioether prepolymers.

Polyvalent Adhesion Promoting Adducts

In certain embodiments, adhesion promoting adducts are polyvalent in which more than one adhesion promoting adduct is bonded to a polyvalent common core.

Polyvalent adhesion promoting adducts may be formed by reacting an adhesion promoting adduct having a reactive group with a reactive group of a polyfunctionalizing agent.

Thus, in certain embodiments, a polyvalent adhesion promoting adduct comprises the reaction product of reactants comprising a z-valent polyfunctionalizing agent comprising terminal functional groups reactive with the functional group of the adhesion promoting adduct and an adhesion promoting adduct comprising an adhesion promoting group, a metal ligand, and a functional group.

An example of an adhesion promoting adduct having a reactive group useful for reacting with a polyfunctionalizing agent include bis(sulfonyl)alkanol derived adhesion promoting adducts such as the adduct of Formula (13), which have a terminal alkenyl group that may reacted with, for example, thiol groups of a polyfunctionalizing agent.

Examples of polyfunctionalizing agents suitable for use in preparing such polyvalent adhesion promoting adducts include trifunctionalizing agents, that is, compounds where z is 3. Suitable trifunctionalizing agents include, for example, triallyl cyanurate (TAC), 1,2,3-propanetrithiol, isocyanurate-containing trithiols, as disclosed in U.S. Publication No. 2010/0010133 at paragraphs [0102]-[0105], the cited portion of which is incorporated herein by reference. Other useful polyfunctionalizing agents include trimethylolpropane trivinyl ether, and the polythiols described in U.S. Pat. Nos. 4,366,307; 4,609,762; and 5,225,472. Mixtures of polyfunctionalizing agents may also be used.

In certain embodiments, polyfunctionalizing agents may have the structure $B(\text{---V})_z$ where B represents the core of the z-valent polyfunctionalizing agent, z is an integer from 3 to 6, and each —V is a moiety comprising a terminal group that is reactive with the functional group of the adhesion promoting adduct. In certain embodiments, z is 3, z is 4, z is 5, and in certain embodiments z is 6. In certain embodiments, a polyfunctional compound is trifunctional. In certain embodiments, a polyfunctional compounds is triallyl cyanurate (TAC) where B has the structure:

[chemical structure of triazine core]

and each —V has the structure —O—CH$_2$—CH=CH$_2$.

In certain embodiments, polyfunctional compound $B(\text{---V})_z$ has a molecular weight less than 800 Daltons, less than 600 Daltons, less than 400 Daltons and in certain embodiments, less than 200 Daltons. Polyfunctional compounds $B(\text{---V})_z$ in which z is at least 3 may be any of the polyfunctionalizing agents useful in polymer chemistry. Polyfunctionalizing agents having mixed functionality, i.e., agents that include moieties (typically separate moieties), that react with both thiol and vinyl groups, may also be employed. Other useful polyfunctionalizing agents include trimethylolpropane trivinyl ether, and the polythiols described in U.S. Pat. No. 4,366,307, U.S. Pat. No. 4,609,762, and U.S. Pat. No. 5,225,472, each of which is incorporated by reference in its entirety. Combinations of polyfunctionalizing agents having the same terminal groups such as thiol groups or allyl groups may also be used.

In certain embodiments, a polyvalent adhesion promoting adduct has a structure of Formula (18):

$$B(\text{---V'}\text{---}R^{14'}\text{-M-}R^{13'}\text{---}R^{12'}\text{---P---}R^{11})_z \quad (18)$$

wherein,
$R^{11}$ comprises an adhesion promoting group;
P comprises a core of an adhesion promoter;
M comprises a metal ligand;
$R^{12'}$ and $R^{13'}$ represent moieties derived from the reaction of $R^{12}$ and $R^{13}$ of adhesion promoter $R^{11}$—P—$R^{12}$ and metal chelating agent $R^{13}$-M-$R^{14}$, wherein $R^{12}$ and $R^{13}$ comprise mutually reactive functional groups, and $R^{14}$ comprises a reactive functional group.
$R^{14'}$ represents a moiety derived from the reaction of $R^{14}$ and V;
B represents a core of a z-valent polyfunctionalizing agent $B(\text{---V})_z$ wherein:
z is an integer from 3 to 6; and
each —V is a group comprising a group reactive with $R^{14}$; and
each —V'— is derived from the reaction of —V with $R^{14}$.

In certain embodiments, a polyvalent adhesion promoting adduct may be formed by reacting an adhesion promoting adduct of Formula (13) with a polyfunctionalizing agent $B(\text{---V})_z$ where the adhesion promoting adduct comprises a functional group such as $R^4$ that is reactive with a functional group of —V.

In certain embodiments, a polyvalent adhesion promoting adduct comprises the reaction product of reactants comprising a polyfunctionalizing agent of formula $B(\text{---V})_z$, wherein, B represents a core of the z-valent polyfunctionalizing agent; z is an integer from 3 to 6; and each —V is a group comprising a first reactive functional group; and an adhesion promoting adduct comprising an adhesion promoting group, a metal ligand, and a second functional group reactive with the first reactive functional group of the polyfunctionalizing agent.

The ratio of adhesion promoting adduct to polyfunctionalizing agent may be adjusted to provide a range of functionalities.

Polyvalent Sulfur-Containing Adhesion Promoting Adducts

In certain embodiments, an adhesion promoting adduct is a polyvalent sulfur-containing adhesion promoting adduct having the structure of Formula (19);

$$B(\text{---V'}\text{---S---}R^1\text{---S---}R^{14'}\text{-M-}R^{13'}\text{---}R^{12'}\text{---P---}R^{11})_z \quad (19)$$

wherein
z is an integer from 1 to 6;
each $R^1$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^3$)$_s$—X—]$_q$—(CHR$^3$)$_r$—;
wherein:
each $R^3$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10;
$R^{11}$ comprises an adhesion promoting group;
P comprises a core of an adhesion promoter;
M comprises a metal ligand;
$R^{12'}$ and $R^{13'}$ represent moieties derived from the reaction of $R^{12}$ and $R^{13}$ of adhesion promoter $R^{11}$—P—$R^{12}$ and metal chelating agent $R^{13}$-M-$R^{14}$, wherein $R^{12}$ and $R^{13}$ comprise mutually reactive functional groups, and $R^{14}$ comprises a reactive functional group.
$R^{14'}$ represents a moiety derived from the reaction of $R^{14}$ and a thiol group;

B represents a core of a z-valent polyfunctionalizing agent B(—V)$_z$ wherein:
  z is an integer from 3 to 6; and
  each —V is a group comprising a group reactive with a thiol group; and
  each —V'— is derived from the reaction of —V with a thiol group.

In certain embodiments, a polyvalent sulfur-containing adhesion promoting adduct comprises the reaction products of reactants comprising: (a) a polyfunctionalizing agent having terminal groups that are reactive with thiol groups; (b) a dithiol; and (c) an adhesion promoting adduct having a functional group reactive with a thiol group. In certain embodiments of the reaction, the reaction products comprise one or more compounds of Formula (19). In polyvalent sulfur-containing adhesion promoting adducts each or some of the arms of the polyfunctionalizing agent can be terminated in an adhesion promoting adduct. In copolymerizable adhesion promoting adducts, at least one arm is reactive with a copolymer and/or curing agent.

In certain embodiments, a polyfunctional compound having terminal groups reactive with thiol groups has the structure B(—V)$_z$ where z is an integer from 3 to 6, and B and —V are as defined herein.

In certain embodiments of B(—V)$_z$, each —V comprises a terminal alkenyl group.

In certain embodiments, a dithiol has the structure of Formula (20):

HS—R$^1$—SH                                   (20)

wherein:
  R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_s$—X—]$_q$—(CHR$^3$)$_r$—;
  wherein:
    each R$^3$ is independently selected from hydrogen and methyl;
    each X is independently selected from —O—, —S—, and —NR— wherein R is selected from hydrogen and methyl;
    s is an integer from 2 to 6;
    q is an integer from 1 to 5; and
    r is an integer from 2 to 10.

In certain embodiments, R$^1$ is —[—(CHR$^3$)$_s$—X—]$_q$—(CHR$^3$)$_r$—.

In certain embodiments of a compound of Formula (20), X is selected from —O— and —S—, and thus —[—(CHR$^3$)$_s$—X—]$_q$—(CHR$^3$)$_r$— in Formula (20) is —[(—CH$_2$—)$_p$—O—]$_q$—(CH$_2$)$_r$— or —[(—CH—)$_p$—S—]$_q$—(CH$_2$)$_r$—. In certain embodiments, p and r are equal, such as where p and r are both two.

In certain embodiments, R$^1$ is selected from C$_{2-6}$ alkanediyl and —[—(CHR$^3$)$_s$—X—]$_q$(CHR$^3$)$_r$—.

In certain embodiments, R$^1$ is —[—(CHR$^3$)$_s$—X—]$_q$—(CHR$^3$)$_r$—, and in certain embodiments X is —O—, and in certain embodiments, X is —S—.

In certain embodiments, where R$^1$ is —[—(CHR$^3$)$_s$—X—]$_q$—(CHR$^3$)$_r$—, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments, where R$^1$ is —[—(CHR$^3$)$_s$—X—]$_q$—(CHR$^3$)$_r$—, each R$^3$ is hydrogen, and in certain embodiments, at least one R$^3$ is methyl.

In certain embodiments of a compound of Formula (20), each R$^1$ is the same, and in certain embodiments, at least one R$^1$ is different.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., C$_{1-6}$) alkyl group, a lower alkoxy group, and a hydroxyl group. Suitable alkyl pendant groups include, for example, C$_{1-6}$ linear alkyl, C$_{3-6}$ branched alkyl, cyclopentyl, and cyclohexyl.

Other examples of suitable dithiols include dimercaptodiethylsulfide (DMDS) (in Formula (20), R$^1$ is —[(—CH$_2$—)$_p$—X—]$_q$—(CH$_2$)$_r$—, wherein p is 2, r is 2, q is 1, and X is —S—); dimercaptodioxaoctane (DMDO) (in Formula (20), R$^1$ is —[(—CH$_2$—)$_p$—X—]$_q$—(CH$_2$)$_r$—, wherein p is 2, q is 2, r is 2, and X is —O—); and 1,5-dimercapto-3-oxapentane (in Formula (20), R$^1$ is —[(—CH$_2$—)$_p$—X—]$_q$—(CH$_2$)$_r$—, wherein p is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Polyvalent sulfur-containing adhesion promoting adducts can impart additional flexibility to the polyvalent adhesion promoting groups that lead to enhanced surface adhesion. In certain embodiments, polyvalent sulfur-containing adhesion promoting adducts can be prepared by first reacting a polyfunctionalizing agent with a sulfur-containing compound to provide a polyfunctionalizing agent having sulfur-containing groups. This intermediate may then be reacted with an adhesion promoting adduct such as an adduct of Formula (13) having functional groups reactive with the sulfur-containing groups. The sulfur-containing polyfunctionalizing agent and the adhesion promoting adduct may be reacted in a ratio such that all or some of the arms of are terminated with an adhesion promoting adduct.

Copolymerizable Adhesion Promoting Adducts

Adhesion promoting adducts that can be directly polymerized to a sulfur-containing polymer backbone can improve the adhesion of a composition such as a sealant composition. A copolymerizable adhesion promoting adduct includes adhesion promoting groups and metal ligands that provide surface adhesion and reactive groups that are reactive with terminal groups of a copolymer and/or curing agent. During the curing reaction, at least some of the terminal groups of the copolymer and the reactive terminal groups of the copolymerizable adhesion promoting adduct can react with a copolymer and/or curing agent and thereby directly bind the copolymerizable adhesion promoting adduct to the polymer network. In other embodiments, a copolymerizable adhesion promoting adduct may include groups that are reactive with the copolymer.

Thus, in certain embodiments, a copolymerizable adhesion promoting adduct comprises the reaction product of reactants comprising an adhesion promoting adduct comprising an adhesion promoting group, a metal ligand, and a reactive functional group; and a z-valent polyfunctionalizing agent comprising functional groups reactive with the functional group of the adhesion promoting adduct; wherein the copolymerizable adhesion promoting adduct comprises from 1 to z−1 terminal adhesion promoting adducts.

In certain embodiments, a copolymerizable adhesion promoting adduct has the structure of Formula (21):

$$B(—V^{1'}—R^{14'}\text{-}M\text{-}R^{13'}—R^{12'}—P—R^{11})_{z1}(—V^2)_{z-z1} \quad (21)$$

wherein, $R^{11}$ comprises an adhesion promoting group;
P comprises a core of an adhesion promoter;
M comprises a metal ligand;
$R^{12'}$ and $R^{13'}$ represent moieties derived from the reaction of $R^{12}$ and $R^{13}$ of adhesion promoter $R^{11}$—P—$R^{12}$ and metal chelating agent $R^{13}$-M-$R^{14}$, wherein $R^{12}$ and $R^{13}$ comprise mutually reactive functional groups, and $R^{14}$ comprises a reactive functional group;
B represents a core of a z-valent polyfunctionalizing agent of Formula (22):

$$B(—V^1)_{z1}(—V^2)_{z-z1} \quad (22)$$

wherein,
z is an integer from 3 to 6;
z1 is an integer from 1 to z−1;
each —$V^1$ is a group comprising a first reactive functional group; and
at least one —$V^2$ comprises a second reactive functional group; and
each $R^{14'}$ represents a moiety derived from the reaction of $R^{14}$ and —$V^1$; and
each —$V^{1'}$— represents a moiety derived from the reaction of —$V^1$ with $R^{14}$.

In certain embodiments, a copolymerizable adhesion promoting adduct comprising the reaction product of reactants comprising:

a polyfunctionalizing agent of Formula (22):

$$B(—V^1)_{z1}(—V^2)_{z-z1} \quad (22)$$

wherein,
B represents a core of a z-valent polyfunctionalizing agent B(—V)$_z$ wherein:
z is an integer from 3 to 6;
z1 is an integer from 1 to z−1;
each —$V^1$ is a group comprising a first reactive functional group; and
at least one —$V^2$ comprises a second reactive functional group; and an adhesion promoting adduct comprising an adhesion promoting group, a metal ligand, and a third functional group reactive with the first reactive functional group.

In certain embodiments, $V^1$ and $V^2$ are the same and in certain embodiments, $V^1$ and $V^2$ are different. In certain embodiments, $V^1$ and $V^2$ comprise the same reactive functional group, and in certain embodiments, $V^1$ and $V^2$ comprise different reactive functional groups. In certain embodiments, each $V^2$ is selected to be reactive with a curing agent, a prepolymer, or a combination thereof. In certain embodiments, each $V^2$ comprises the same reactive group as a prepolymer forming a composition.

Copolymerizable adhesion promoting adducts include at least some groups that are reactive with a curing agent or copolymer such as from 2 to 5 groups that are reactive with a curing agent and/or copolymer.

Copolymerizable Sulfur-Containing Adhesion Promoting Adducts

In certain embodiments, a copolymerizable adhesion promoting adduct can be a copolymerizable sulfur-containing adhesion promoting adduct. Copolymerizable sulfur-containing adhesion promoters are disclosed in U.S. application Ser. No. 13/529,183. These copolymerizable sulfur-containing adhesion promoting adducts contain a sulfur-containing group bound to a polyfunctional core where at least some of the sulfur-containing groups are terminated with a group reactive with either the curing agent or a prepolymer, with other groups terminated with an adhesion promoting adduct.

Embodiments of the present disclosure include copolymerizable adhesion promoters analogous to those disclosed in U.S. application Ser. No. 13/529,183 in which an adhesion promoting adduct of the present disclosure replaces at least some or all of the adhesion promoters disclosed therein.

Thus, in certain embodiments, a copolymerizable sulfur-containing adhesion promoting adduct comprises the reaction product of reactants comprising a dithiol; a polyfunctionalizing agent comprising functional groups reactive with thiol groups; and an adhesion promoting adduct comprising an adhesion promoting group, a metal ligand, and a group reactive with a thiol group. In certain embodiments, compounds other than dithiols can be used to introduce sulfur-containing groups into the adduct.

In certain embodiments, a copolymerizable sulfur-containing adhesion promoting adduct has the structure of Formula (23);

$$B(—V'—S—R^1—S—R^{14'}\text{-}M\text{-}R^{13'}—R^{12'}—P—R^{11})_{z1}$$
$$(—V'—S—R—SH)_{z-z1} \quad (23)$$

wherein
each $R^1$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^3$)$_s$—X—]$_q$—(CHR$^3$)$_r$—;
wherein:
each $R^3$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10;
$R^{11}$ comprises an adhesion promoting group;
P comprises a core of an adhesion promoter;
M comprises a metal ligand;
$R^{12'}$ and $R^{13'}$ represent moieties derived from the reaction of $R^{12}$ and $R^{13}$ of adhesion promoter $R^{11}$—P—$R^{12}$ and metal chelating agent $R^{13}$-M-$R^{14}$, wherein $R^{12}$ and $R^{13}$ comprise mutually reactive functional groups, and $R^{14}$ comprises a reactive functional group.
$R^{14'}$ represents a moiety derived from the reaction of $R^{14}$ and a thiol group;
B represents a core of a z-valent polyfunctionalizing agent B(—V)$_z$ wherein:
z is an integer from 3 to 6;
z1 is an integer from 1 to z−1; and
each —V is a group comprising a group reactive with a thiol group; and
each —V'— is derived from the reaction of —V with a thiol group.

In certain embodiments, a copolymerizable sulfur-containing adhesion promoting adduct comprising the reaction product of reactants comprising a dithiol; a polyfunctionalizing agent comprising functional groups reactive with thiol groups; and the adhesion promoting adduct of claim 1 comprising functional groups reactive with thiol groups.

In certain embodiments, copolymerizable adhesion promoting adducts provided by the present disclosure can be copolymerized to the backbone of a sulfur-containing polymer such as a thiol-terminated sulfur-containing polymer, including, for example, thiol-terminated polythioethers and thiol-terminated polysulfides.

In certain embodiments, an adhesion promoting adduct can be copolymerized to a thiol-terminated polythioether polymer. Examples of thiol-functional polythioethers are disclosed, for example, in U.S. Pat. No. 6,172,179. In certain embodiments, a thiol-functional polythioether comprises Permapol® P3.1E, available from PRC-DeSoto International Inc., Sylmar, Calif.

In certain embodiments, an adhesion promoting adduct can be copolymerized to a polysulfide polymer. In certain embodiments, a polysulfide polymer can be any of the polymers disclosed, for example, in U.S. Pat. No. 4,623,711.

Compounds of Formula (21) and (23) comprise at least one terminal adhesion promoting adduct and at least two terminal thiol groups. The at least one adhesion promoting adduct provides adhesion to a surface and/or other constituent of a formulation of which it is a part, and the terminal thiol-groups react with a curing agent to form a polymer network. Thus, in compounds of Formula (21) and (23), z2 is at least 2, and in certain embodiments, z2 is 2, 3, 4, and in certain embodiments z2 is 5. In certain embodiments of compounds of Formula (21) and (23), z1 is 1, 2, 3, and in certain embodiments, z1 is 4. In certain embodiments, a compound of Formula (21) and (17) is trivalent, such that z is 3, in certain embodiments, a compound of Formula (21) and (23) is tetravalent such that z is 4, and in certain embodiments, z is 5, and in certain embodiments, z is 6.

In certain embodiments of Formula (21) and (23), $R^1$ is selected from $C_{2-6}$ alkanediyl and $-[-(CHR^3)_s-X-]_q-(CHR^3)_r-$.

In certain embodiments of Formula (21) and (23), $R^1$ is $-[-(CHR^3)_s-X-]_q-(CHR^3)_r-$, and in certain embodiments X is $-O-$ and in certain embodiments, X is $-S-$.

In certain embodiments of Formula (21) and (23) where $R^1$ is $-[-(CHR^3)_s-X-]_q(CHR^3)_r-$, p is 2, r is 2, q is 1, and X is $-S-$; in certain embodiments, p is 2, q is 2, r is 2, and X is $-O-$; and in certain embodiments, p is 2, r is 2, q is 1, and X is $-O-$.

In certain embodiments of Formula (21) and (23) where $R^1$ is $-[-(CHR^3)_s-X-]_q(CHR^3)_r-$, each $R^3$ is hydrogen, and in certain embodiments, at least one $R^3$ is methyl.

In certain embodiment of a compound of Formula (21) and (23), each $R^1$ is the same, and in certain embodiments, at least one $R^1$ is different.

In certain embodiments of a compound of Formula (21) and (23), the terminal group that is reactive with a thiol group in compound A is selected from an alkenyl group, an isocyanate group, an epoxy group, a Michael acceptor group, and a group comprising a saturated carbon bearing a leaving group that are well suited for nucleophilic substitution such as, for example, $-Cl$, $-Br$, $-I$, $-OSO_2CH_3$ (mesylate), $-OSO_2-C_6H_4-CH_3$ (tosylate), etc. In certain embodiments of a compound of Formula (21) and (23), the terminal group that is reactive with a thiol group in compound A is an alkenyl group, an isocyanate group, an epoxy group, a Michael acceptor group, and in certain embodiments, a group comprising a saturated carbon bearing a leaving group that are well suited for nucleophilic substitution such as, for example, $-Cl$, $-Br$, $-I$, $-OSO_2CH_3$ (mesylate), $-OSO_2-C_6H_4-CH_3$ (tosylate), etc.

In certain embodiments of a compound of Formula (21) and (23), a terminal group that promotes adhesion is selected from a polyalkoxysilyl, a phosphonate, an amine, a carboxylic acid, and a phosphonic acid. In certain embodiments of a compound of Formula (21) and (23), a terminal group that promotes adhesion is a polyalkoxysilyl group, a phosphonate group, an amine group, a carboxylic acid group, and in certain embodiments, a phosphonic acid group.

In certain embodiments of a compound of Formula (21) and (23), a metal ligand is selected from any of those disclosed herein.

In certain embodiments, $-V$ is a moiety comprising a terminal group that is reactive with a thiol group. For example, in certain embodiments, $-V$ is $-R^{10}-CH=CH_2$, wherein $R^{10}$ is selected from $C_{1-6}$ alkanediyl, substituted $C_{1-6}$ alkanediyl, $C_{1-6}$ heteroalkanediyl, and substituted $C_{1-6}$ heteroalkanediyl. However, the structure of $-V$ is not limited. In certain embodiments, each $-V$ may be the same, and in certain embodiments, at least one $-V$ may be different.

In certain embodiments of a compound of Formula (21) and (23), each adhesion promoting adduct group is the same and is selected from Formula (24a), Formula (24b), Formula (24c), and Formula (24d):

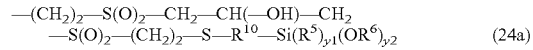
(24a)

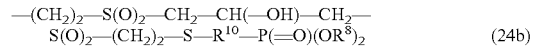
(24b)

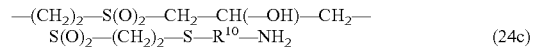
(24c)

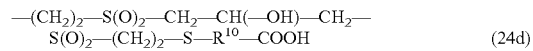
(24d)

where each $R^{10}$ is $C_{2-8}$ alkanediyl, y1 is selected from 0, 1, and 2; y2 is selected from 1, 2, and 3; wherein the sum of y1 and y2 is 3; each $R^5$ and $R^6$ is independently selected from $C_{1-4}$ alkyl; and $R^8$ is selected from hydrogen and $C_{1-4}$ alkyl.

In certain embodiments of a compound of Formula (21) and (23), each -A' is the same and is a moiety of Formula (24a), a moiety of Formula (24b), a moiety of Formula (24c), and in certain embodiments, a moiety of Formula (24d).

In copolymerizable sulfur-containing adhesion promoting adducts of Formula (21) and Formula (23), B represents a core of a z-valent, polyfunctional compound $B(-V)_z$, where z is an integer from 3 to 6. In certain embodiments, z is 3, z is 4, z is 5, and in certain embodiments z is 6. In certain embodiments, a polyfunctional compound is trifunctional. In certain embodiments, a polyfunctional compounds is triallyl cyanurate (TAC) where B has the structure:

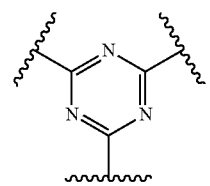 [SMILES: *c1nc(*)nc(*)n1]

and each $-V$ has the structure $-O-CH_2-CH=CH_2$.

In certain embodiments, polyfunctional compound $B(-V)_z$ has a molecular weight less than 800 Daltons, less than 600 Daltons, less than 400 Daltons and in certain embodiments, less than 200 Daltons. Polyfunctional compounds $B(-V)_z$ in which z is at least 3 may be any of the polyfunctionalizing agents useful in polymer chemistry. Polyfunctionalizing agents having mixed functionality, i.e., agents that include moieties (typically separate moieties), that react with both thiol and vinyl groups, may also be employed. Other useful polyfunctionalizing agents include trimethylolpropane trivinyl ether, and the polythiols described in U.S. Pat. No. 4,366,307, U.S. Pat. No. 4,609,762, and U.S. Pat. No. 5,225,472, each of which is incorporated by reference in its entirety. Combinations of polyfunctionalizing agents having the same terminal groups such as thiol groups or allyl groups may also be used.

In certain embodiments, each —V is a moiety comprising a terminal group that is reactive with a thiol group such as, for example, an alkenyl group, an epoxy group, a Michael acceptor group, or a group comprising a saturated carbon bearing a leaving group that are well suited for nucleophilic substitution such as, for example, —Cl, —Br, —I, —OSO$_2$CH$_3$ (mesylate), —OSO$_2$—C$_6$H$_4$—CH$_3$ (tosylate), etc. In certain embodiments, each —V is the same, and in certain embodiments, at least one —V is different. In certain embodiments, —V is selected from C$_{3-8}$ alkene-1-yl and C$_{3-8}$ heteroalkene-1-yl, where the one or more hetero groups is selected from —O— and —S—.

Each —V'— represents a moiety formed by the reaction of a moiety —V with a thiol group. In certain embodiments, —V comprises a terminal alkenyl group selected from C$_{3-8}$ alkene-1-yl and C$_{3-8}$ heteroalkene-1-yl, and V' is selected from C$_{3-8}$ alkanediyl and C$_{3-8}$ heteroalkanediyl.

In certain embodiments, a polyfunctionalizing agent having terminal groups reactive with thiol groups has the structure B(—V)$_z$ where z is an integer from 3 to 6, and B and —V are as defined herein.

In certain embodiments of B(—V)$_z$, each —V comprises a terminal alkenyl group.

In certain embodiments, a copolymerizable sulfur-containing adhesion promoter of Formula (23) comprises the reaction product of (a) a polyfunctionalizing agent having terminal groups that are reactive with thiol groups; (b) a dithiol; and (c) an adhesion promoting adduct having a functional group reactive with a thiol group. In certain embodiments of the reaction, the reaction products comprise one or more compounds of Formula (23). The polyfunctionalizing agent and the adhesion promoting adduct may be, for example, any of those disclosed herein and the dithiol may be a dithiol of Formula (20).

In certain embodiments, a dithiol has the structure of Formula (20):

HS—R$^1$—SH    (20)

wherein:
R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_s$—X—]$_q$—(CHR$^3$)$_r$—;
wherein:
  each R$^3$ is independently selected from hydrogen and methyl;
  each X is independently selected from —O—, —S—, and —NR— wherein R is selected from hydrogen and methyl;
  s is an integer from 2 to 6;
  q is an integer from 1 to 5; and
  r is an integer from 2 to 10.
In certain embodiments, R$^1$ is —[—(CHR$^3$)$_s$—X—]$_q$—(CHR$^3$)$_r$—.

In certain embodiments of a compound of Formula (20), X is selected from —O— and —S—, and thus —[—(CHR$^3$)$_s$—X—]$_q$—(CHR$^3$)$_r$— in Formula (20) is —[(—CH$_2$—)$_p$—O—]$_q$—(CH$_2$)$_r$— or —[(—CH—)$_p$—S—]$_q$—(CH$_2$)$_r$—. In certain embodiments, p and r are equal, such as where p and r are both two.

In certain embodiments, R$^1$ is selected from C$_{2-6}$ alkanediyl and —[—(CHR$^3$)$_s$—X—]$_q$(CHR$^3$)$_r$—.

In certain embodiments, R$^1$ is —[—(CHR$^3$)$_s$—X—]$_q$—(CHR$^3$)$_r$—, and in certain embodiments X is —O—, and in certain embodiments, X is —S—.

In certain embodiments, where R$^1$ is —[—(CHR$^3$)$_s$—X—]$_q$—(CHR$^3$)$_r$—, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments, where R$^1$ is —[—(CHR$^3$)$_s$—X—]$_q$—(CHR$^3$)$_r$—, each R$^3$ is hydrogen, and in certain embodiments, at least one R$^3$ is methyl.

In certain embodiments of a compound of Formula (20), each R$^1$ is the same, and in certain embodiments, at least one R$^1$ is different.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., C$_{1-6}$) alkyl group, a lower alkoxy group, and a hydroxyl group. Suitable alkyl pendant groups include, for example, C$_{1-6}$ linear alkyl, C$_{3-6}$ branched alkyl, cyclopentyl, and cyclohexyl.

Other examples of suitable dithiols include dimercaptodiethylsulfide (DMDS) (in Formula (20), R$^1$ is —[(—CH$_2$—)$_p$—X—]$_q$—(CH$_2$)$_r$—, wherein p is 2, r is 2, q is 1, and X is —S—); dimercaptodioxaoctane (DMDO) (in Formula (20), R$^1$ is —[(—CH$_2$—)$_p$—X—]$_q$—(CH$_2$)$_r$—, wherein p is 2, q is 2, r is 2, and X is —O—); and 1,5-dimercapto-3-oxapentane (in Formula (20), R$^1$ is —[(—CH$_2$—)$_p$—X—]$_q$—(CH$_2$)$_r$—, wherein p is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

In certain embodiments of a reaction to form a copolymerizable sulfur-containing adhesion promoting adduct, the polyfunctionalizing agent and the dithiol may be reacted to form a thiol-terminated intermediate. As such, the molar ratios of the reactants are appropriately selected. For example, one mole of a trifunctional compound such as TAC can be reacted with three moles of a dithiol such as DMDO to provide a trifunctional, thiol-terminated intermediate. A trifunctional, thiol-terminated intermediate may subsequently be reacted with a compound comprising a group that is reactive with a thiol group and a group that promotes adhesion. The molar ratio of the intermediate and a compound comprising a group that is reactive with a thiol group and a group that promotes adhesion may be selected to provide a polyfunctional compound having a desired average sulfur-containing adhesion promoting adduct functionality. For example, to obtain an average adhesion promoter functionality of about one, about one mole of polyfunctional intermediate is reacted with about one mole of a compound comprising a terminal group that is reactive with a thiol group and a terminal group that promotes adhesion.

In copolymerizable sulfur-containing adhesion promoting adducts provided by the present disclosure it is intended that the compounds comprise at least one terminal group that promotes adhesion and at least two terminal groups such as terminal thiol groups, capable of reacting with a curing agent and thereby be incorporated into the backbone of the polymer network, e.g., copolymerized. In certain embodiments, the sulfur-containing compound comprises, on average, a single adhesion promoting group per molecule, and in certain embodiments, an average of two adhesion promoting groups per molecule.

In certain embodiments, a copolymerizable sulfur-containing adhesion promoting adduct comprises the reaction products of reactants comprising triallycyanurate, DMDO, and an adhesion promoting adduct provided by the present disclosure.

Compositions

Adhesion promoting adducts provided by the present disclosure may be used in polymer compositions, such as compositions formulated as sealants useful in the aerospace industry.

Adhesion promoting adducts such as those represented by Formula (13), Formula (18), Formula (19), Formula (21), Formula (23), or a combination of any of the foregoing may be used as adhesion promoting additives in a compositions. In certain embodiments, an adhesion promoting adduct comprises, for example, from 1 wt % to 50 wt %, from 5 wt % to 30 wt %, or from 1 wt % to 10 wt %, of a composition.

In other embodiments in which the adhesion promoting adduct is copolymerizable such as those represented by Formula (21) and (23), wherein the copolymerizable adhesion promoting adduct is included with a copolymer and/or curing agent having a suitable chemistry to incorporated the copolymerizable adhesion promoting adduct into cured polymer.

Compositions may also contain a combination of one or more adhesion promoting adducts and/or copolymerizable adhesion promoting adducts provided by the present disclosure.

For aerospace sealant applications, a composition can comprise a sulfur-containing polymer. In certain embodiments, a sulfur-containing prepolymer comprises a thiol-terminated sulfur-containing prepolymer selected from a thiol-terminated polythioether prepolymer, a thiol-terminated polysulfide prepolymer, a thiol-terminated sulfur-containing polyformal prepolymer, and a combination of any of the foregoing. In certain embodiments, a sulfur-containing prepolymer comprises a thiol-terminated polythioether prepolymer.

In certain embodiments, a thiol-terminated sulfur-containing polymer comprises a thiol-terminated polythioether. A thiol-terminated polythioether may comprise a mixture of different polythioethers and the polythioethers may have the same or different functionality of thiol groups. In certain embodiments, a thiol-terminated polythioether has an average functionality from 2 to 6, from 2 to 4, from 2 to 3, and in certain embodiments, from 2.05 to 2.8. For example, a thiol-terminated polythioether may be selected from a difunctional sulfur-containing polymer, a trifunctional sulfur-containing polymer, and a combination thereof.

Examples of thiol-functional polythioethers are disclosed, for example in U.S. Pat. No. 6,172,179. In certain embodiments, a thiol-functional polythioether comprises Permapol® P3.1E available from PRC-DeSoto International Inc., Sylmar, Calif.

In certain embodiments, a thiol-terminated polythioether comprises (a) a backbone comprising a structure having the Formula (25):

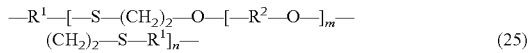
(25)

where (i) each $R^1$ is independently selected from a $C_{2-10}$ n-alkanediyl group, a $C_{3-6}$ branched alkanediyl group, a $C_{6-8}$ cycloalkanediyl e group, a $C_{6-10}$ alkanecycloalkanediyl group, a heterocyclic group, a —[(—$CH_2$—)$_p$—X—]$_q$—(CH$_2$)$_r$— group, and a —[(—$CH_2$—)$_p$—X—]$_q$—(CH$_2$)$_r$— group in which at least one —CH$_2$— unit is substituted with a methyl group; (ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a —[(—$CH_2$—)$_p$—X—]$_q$—(CH$_2$)$_r$— group; (iii) each X is independently selected from O, S, and a —NR— group, in which R is selected from hydrogen and a methyl group; (iv) m ranges from 0 to 50; (v) n is an integer from 1 to 60; (vi) p is an integer from 2 to 6; (vii) q is an integer from 1 to 5; and (viii) r is an integer from 2 to 10.

In certain embodiments, a thiol-terminated polythioether is selected from a thiol-terminated polythioether of Formula (26a), a thiol-terminated polythioether of Formula (26b), and a combination thereof:

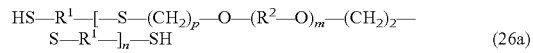
(26a)

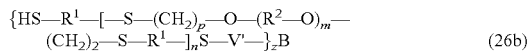
(26b)

where:
each $R^1$ independently is selected from $C_{2-6}$ alkanediyl, $C_{6-8}$ cycloalkanediyl, $C_{6-10}$ alkanecycloalkanediyl, $C_{5-8}$ heterocycloalkanediyl, and —[(—CHR$^3$—)$_s$—X—]$_q$—(—CHR$^3$—)$_r$—, where:
s is an integer from 2 to 6;
q is an integer from 1 to 5;
r is an integer from 2 to 10;
each $R^3$ is independently selected from hydrogen and methyl; and
each X is independently selected from O, S, and —NHR—, where R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(—CHR$^3$—)$_s$—X—]$_q$—(—CHR$^3$—)$_r$—, wherein s, q, r, $R^3$, and X are as defined above;
m is an integer from 0 to 50;
n is an integer from 1 to 60;
p is an integer from 2 to 6;
B represents a core of a z-valent, a polyfunctional compound B(—V)$_z$ wherein:
z is an integer from 3 to 6; and
each —V is a moiety comprising a terminal group that is reactive with a thiol group; and
each —V'— represents a moiety formed by the reaction of each —V with a thiol group.

In certain embodiments, $R^1$ in Formula (26a) and in Formula (26b) is —[(—CH$_2$—)$_p$—X—]$_q$—(CH$_2$)$_r$—, where p is 2, X is —O—, q is 2, r is 2, $R^2$ is ethanediyl, m is 2, and n is 9.

In certain embodiments of Formula (26a) and Formula (26b), $R^1$ is selected from $C_{2-6}$ alkanediyl and —[—(CHR$^3$)$_s$—X—]$_q$—(CHR$^3$)$_r$—.

In certain embodiments of Formula (26a) and Formula (26b), R¹ is —[—(CHR³)ₛ—X—]_q—(CHR³)_r—, and in certain embodiments X is —O— and in certain embodiments, X is —S—.

In certain embodiments of Formula (26a) and Formula (26b), where R¹ is —[—(CHR³)ₛ—X—]_q—(CHR³)_r—, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments of Formula (26a) and Formula (26b), where R¹ is —[—(CHR³)ₛ—X—]_q—(CHR³)_r—, each R³ is hydrogen, and in certain embodiments, at least one R³ is methyl.

In certain embodiment of compounds of Formula (26a) and Formula (26b), each R¹ is the same, and in certain embodiments, at least one R¹ is different.

Various methods can be used to prepare such polythioethers. Examples of suitable thiol-functional polythioethers, and methods for their production, which are suitable for use in compositions disclosed herein, are described in U.S. Pat. No. 6,172,179 at col. 2, line 29 to col. 4, line 22; col. 6, line 39 to col. 10, line 50; and col. 11, lines 65 to col. 12, line 22, the cited portions of which are incorporated herein by reference. Such thiol-functional polythioethers may be difunctional, that is, linear polymers having two thiol end groups, or polyfunctional, that is, branched polymers have three or more thiol end groups. Suitable thiol-functional polythioethers are commercially available, for example, as Permapol® P3.1E from PRC-DeSoto International Inc., Sylmar, Calif.

Suitable thiol-functional polythioethers may be produced by reacting a divinyl ether or mixtures of divinyl ethers with an excess of dithiol or a mixtures of dithiols. For example, dithiols suitable for use in preparing such thiol-functional polythioethers include those having Formula (20), other dithiols disclosed herein, or combinations of any of the dithiols disclosed herein.

Suitable divinyl ethers include, for example, divinyl ethers have Formula (27):

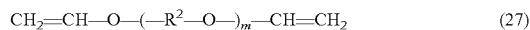

$CH_2=CH-O-(-R^2-O-)_m-CH=CH_2$ (27)

where R² in Formula (27) is selected from a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and —[(—CH₂—)_p—O—]_q—(—CH₂—)_r—, where p is an integer ranging from 2 to 6, q is an integer from 1 to 5, and r is an integer from 2 to 10. In certain embodiments of a divinyl ether of Formula (27), R² is a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and in certain embodiments, —[(—CH₂—)_p—O—]_q—(—CH₂—)_r—.

Suitable divinyl ethers include, for example, compounds having at least one oxyalkanediyl group, such as from 1 to 4 oxyalkanediyl groups, i.e., compounds in which m in Formula (27) is an integer ranging from 1 to 4. In certain embodiments, m in Formula (27) is an integer ranging from 2 to 4. It is also possible to employ commercially available divinyl ether mixtures that are characterized by a non-integral average value for the number of oxyalkanediyl units per molecule. Thus, m in Formula (27) can also take on rational number values ranging from 0 to 10.0, such as from 1.0 to 10.0, from 1.0 to 4.0, or from 2.0 to 4.0.

Examples of suitable divinyl ethers include, for example, divinyl ether, ethylene glycol divinyl ether (EG-DVE) (R² in Formula (27) is ethanediyl and m is 1), butanediol divinyl ether (BD-DVE) (R² in Formula (27) is butanediyl and m is 1), hexanediol divinyl ether (HD-DVE) (R² in Formula (27) is hexanediyl and m is 1), diethylene glycol divinyl ether (DEG-DVE) (R² in Formula (27) is ethanediyl and m is 2), triethylene glycol divinyl ether (R² in Formula (27) is ethanediyl and m is 3), tetraethylene glycol divinyl ether (R² in Formula (27) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxyl groups, alkoxy groups, and amine groups.

In certain embodiments, divinyl ethers in which R² in Formula (27) is $C_{3-6}$ branched alkanediyl may be prepared by reacting a polyhydroxy compound with acetylene. Examples of divinyl ethers of this type include compounds in which R² in Formula (27) is an alkyl-substituted methanediyl group such as —CH(CH₃)— (for example Pluriol® blends such as Pluriol®E-200 divinyl ether (BASF Corp., Parsippany, N.J.), for which R² in Formula (27) is ethanediyl and m is 3.8) or an alkyl-substituted ethanediyl (for example —CH₂CH(CH₃)— such as DPE polymeric blends including DPE-2 and DPE-3 (International Specialty Products, Wayne, N.J.)).

Other useful divinyl ethers include compounds in which R² in Formula (27) is polytetrahydrofuryl (poly-THF) or polyoxyalkanediyl, such as those having an average of about 3 monomer units.

Two or more types of polyvinyl ether monomers of Formula (27) may be used. Thus, in certain embodiments, two dithiols of Formula (20) and one polyvinyl ether monomer of Formula (27), one dithiol of Formula (20) and two polyvinyl ether monomers of Formula (27), two dithiols of Formula (20) and two divinyl ether monomers of Formula (27), and more than two compounds of one or both formulas, may be used to produce a variety of thiol-functional polythioethers.

In certain embodiments, a polyvinyl ether monomer comprises 20 to less than 50 mole percent of the reactants used to prepare a thiol-functional polythioether, and, in certain embodiments, 30 to less than 50 mole percent.

In certain embodiments provided by the present disclosure, relative amounts of dithiols and divinyl ethers are selected to yield terminal thiol groups. Thus, a dithiol of Formula (20) or a mixture of at least two different dithiols of Formula (20), are reacted with of a divinyl ether of Formula (27) or a mixture of at least two different divinyl ethers of Formula (27) in relative amounts such that the molar ratio of thiol groups to vinyl groups is greater than 1:1, such as 1.1 to 2.0:1.0.

The reaction between compounds of dithiols and divinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts are alkyl peroxides, such as t-butyl peroxide. The reaction may also be effected by irradiation with ultraviolet light either with or without a cationic photoinitiating moiety.

Thiol-functional polythioethers provided by the present disclosure may be prepared by combining at least one compound of Formula (20) and at least one compound of Formula

(27) followed by addition of an appropriate catalyst, and carrying out the reaction at a temperature from 30° C. to 120° C., such as 70° C. to 90° C., for a time from 2 to 24 hours, such as 2 to 6 hours.

As disclosed herein, thiol-terminated polythioethers may comprise a polyfunctional polythioether, i.e., may have an average functionality of greater than 2.0. Suitable polyfunctional thiol-terminated polythioethers include, for example, those having the structure of Formula (28):

$$B(\text{-}A\text{-}SH)_z \qquad (28)$$

wherein: (i) A comprises a structure of Formula (28), (ii) B denotes a z-valent residue of a polyfunctionalizing agent; and (iii) z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-functional polymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Publication No. 2010/0010133 at paragraphs [0102]-[0105], the cited portion of which is incorporated herein by reference. Other useful polyfunctionalizing agents include trimethylolpropane trivinyl ether, and the polythiols described in U.S. Pat. Nos. 4,366,307; 4,609,762; and 5,225,472. Mixtures of polyfunctionalizing agents can also be used.

As a result, thiol-functional polythioethers suitable for use in embodiments provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be affected by factors such as stoichiometry, as will be understood by those skilled in the art.

Thiol-functional polythioethers having a functionality greater than 2.0 may be prepared in a manner similar to the difunctional thiol-functional polythioethers described in U.S. Publication No. 2010/0010133. In certain embodiments, polythioethers may be prepared by combining (i) one or more dithiols described herein, with (ii) one or more divinyl ethers described herein, and (iii) one or more polyfunctionalizing agents. The mixture may then be reacted, optionally in the presence of a suitable catalyst, to afford a thiol-functional polythioether having a functionality greater than 2.0.

Thus, in certain embodiments, a thiol-terminated polythioether comprises the reaction product of reactants comprising:

(a) a dithiol of Formula (20):

$$HS\text{—}R^1\text{—}SH \qquad (20)$$

wherein:
R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_s$—X—]$_q$—(CHR$^3$)$_r$—; wherein:
each R$^3$ is independently selected from hydrogen and methyl;
each X is independently selected from —O—, —S—, —NH—, and —NR—
wherein R is selected from hydrogen and methyl;
s is an integer from 2 to 6;
q is an integer from 1 to 5; and
r is an integer from 2 to 10; and (b) a divinyl ether of Formula (27):

$$CH_2\!=\!CH\text{—}O\text{—}[\text{—}R^2\text{—}O\text{—}]_m\text{—}CH\!=\!CH_2 \qquad (27)$$

wherein:
each R$^2$ is independently selected from C$_{1-10}$ alkanediyl, C$_{6-8}$ cycloalkanediyl, C$_{6-14}$ alkanecycloalkanediyl, and —[(—CHR$^3$—)$_s$—X—]$_q$—(—CHR$^3$—)$_r$—, wherein s, q, r, R$^3$, and X are as defined above;
m is an integer from 0 to 50;
n is an integer from 1 to 60; and
p is an integer from 2 to 6.

And, in certain embodiments, the reactants comprise (c) a polyfunctional compound such as a polyfunctional compound B(—V)$_z$, where B, —V, and z are as defined herein.

Thiol-terminated polythioethers provided by the present disclosure represent thiol-terminated polythioethers having a molecular weight distribution. In certain embodiments, thiol-terminated polythioethers useful in compositions can exhibit a number average molecular weight ranging from 500 Daltons to 20,000 Daltons, in certain embodiments, from 2,000 Daltons to 5,000 Daltons, and in certain embodiments, from 3,000 Daltons to 4,000 Daltons. In certain embodiments, thiol-terminated polythioethers useful in compositions provided by the present disclosure exhibit a polydispersity ($M_w/M_n$; weight average molecular weight/number average molecular weight) ranging from 1 to 20, and in certain embodiments, from 1 to 5. The molecular weight distribution of thiol-terminated polythioethers may be characterized by gel permeation chromatography.

Curable compositions may further include a curing agent. Compositions may further include additives, catalysts, fillers, and/or other sulfur-containing prepolymers including for example, polythioethers, sulfur-containing polyformals, and/or polysulfides.

A suitable curing agent is selected to be reactive with the terminal groups of the bis(sulfonyl)alkanol-containing polythioether and optional sulfur-containing prepolymers.

In certain embodiments in which a bis(sulfonyl)alkanol-containing polythioether or prepolymer thereof is terminated with thiol groups, a suitable curing agent is a polyepoxide. Examples of suitable polyepoxies include, for example, polyepoxide resins such as hydantoin diepoxide, diglycidyl ether of bisphenol-A, diglycidyl ether of bisphenol-F, Novolac® type epoxides such as DEN™ 438 (Dow Chemical Company), certain epoxidized unsaturated resins, and combinations of any of the foregoing. A polyepoxide refers to a compound having two or more reactive epoxy groups. In certain embodiments, an epoxy curing agent is selected from EPON™ 828 (Momentive Specialty Chemicals, Inc), DEN™ 431 (Dow Chemical Company), and a combination thereof. Examples of useful curing agents that are reactive with thiol groups include diepoxides.

Other examples of useful curing agents that are reactive with terminal epoxy groups include amines such as diethylenetriamine (DTA), triethylenetetramine (TTA), tetraethylenepentamine (TEPA), diethylaminopropylamine (DEAPA), N-aminoethylpiperazine (N-AEP), isophoronediamine (IPDA), m-xylenediamine, diaminodiphenylmethane (DDM), diaminodiphenylsulfone (DDS); aromatic amines; ketimine; polyamines; polyamides; phenolic resins; anhydrides such phthalic anhydride, trimellitic anhydride, pyromellitic anhydride, benzophenone tetracarboxylic anhydride, ethylene glycol bistrimellitate, glycerol tristrimellitate, maleic anhydride, tetrahydrophthalic anhydride, methyltetrahydrophthalic anhydride, endomethylene tetrahydrophthalic anhydride; polymercaptans; polysulfides; and other curing agents known to those skilled in the art.

In certain embodiments, a polyepoxy curing agent comprises an epoxy-functional polymer. Examples of suitable epoxy-functional polymers include the epoxy-functional sulfur-containing polyformal polymers disclosed in U.S. patent application Ser. No. 13/050,988 and epoxy-functional polythioether polymers disclosed in U.S. Pat. No. 7,671,145. In general, when used as a curing agent, an epoxy-functional polymer has a molecular weight less than about 2,000 Daltons, less than about 1,500, Daltons, less than about 1,000 Daltons, and in certain embodiments, less than about 500 Daltons.

In certain embodiments, a polyepoxy may comprise about 0.5 wt % to about 20 wt % of the composition, from about 1 wt % to about 10 wt %, from about 2 wt % to about 8 wt %, from about 2 wt % to about 6 wt %, and in certain embodiments, from about 3 wt % to about 5 wt %, where wt % is based on the total solids weight of the composition.

In certain embodiments in which a bis(sulfonyl)alkanol-containing polythioether or prepolymer is terminated with thiol groups, a suitable curing agent is an unsaturated compound such as an acrylic or methacrylic ester of a polyol, unsaturated synthetic or naturally occurring resin compounds, triallyl cyanurate, and olefin terminated derivatives of sulfur-containing compound such as polythioethers.

In certain embodiments, such as when amine and/or hydroxyl-terminated bis(sulfonyl)alkanol-containing polythioethers or prepolymers thereof are used, compositions provided by the present disclosure may comprise an isocyanate curing agent such as a diisocyanate and/or triisocyanate curing agent. Examples of suitable isocyanate curing agents include toluene diisocyanate, and combinations of any of the foregoing. Isocyanate curing agents are commercially available and include, for example, products under the tradenames Baydur® (Bayer MaterialScience), Desmodur® (Bayer MaterialScience), Solubond® (DSM), ECCO (ECCO), Vestanat® (Evonik), Irodur® (Huntsman), Rhodocoat™ (Perstorp), and Vanchem® (V.T. Vanderbilt). In certain embodiments, a polyisocyanate curing agent comprises isocyanate groups that are reactive with thiol groups and that are less reactive with Michael acceptor groups. Examples of useful curing agents that are reactive with amine groups include polymeric polyisocyanates, non-limiting examples of which include polyisocyanates having backbone linkages chosen from urethane linkages (—NH—C(O)—O—), thiourethane linkages (—NH—C(O)—S—), thiocarbamate linkages (—NH—C(S)—O—), dithiourethane linkages (—NH—C(S)—S—), and combinations of any of the foregoing.

In certain embodiments, an isocyanate curing agent comprises an isocyanate-functional polymer. Examples of suitable isocyanate-functional polymers include the isocyanate-functional sulfur-containing polyformal polymers disclosed in U.S. patent application Ser. No. 13/051,002. In general, when used as a curing agent, an isocyanate-functional polymer has a molecular weight less than about 2,000 Daltons, less than about 1,500, Daltons, less than about 1,000 Daltons, and in certain embodiments, less than about 500 Daltons.

In such compositions, an isocyanate curing agent may comprise about 0.5 wt % to about 20 wt % of the composition, from about 1 wt % to about 10 wt %, from about 2 wt % to about 8 wt %, from about 2 wt % to about 6 wt %, and in certain embodiments, from about 3 wt % to about 5 wt % of the composition, where wt % is based on the total solids weight of the composition.

In certain embodiments, such as when isocyanate-terminated bis(sulfonyl)alkanol-containing polythioethers or prepolymers thereof are used, compositions provided by the present disclosure comprise an amine curing agent. Examples of useful curing agents that are reactive with isocyanate groups include diamines, polyamines, polythiols, and polyols, including those disclosed herein.

In certain embodiments, such as when Michael acceptor-terminated bis(sulfonyl)alkanol-containing polythioethers or prepolymers thereof are used, compositions provided by the present disclosure comprise a curing agent selected from a monomeric thiol, a polythiol, a polyamine, and a blocked polyamine.

Curing agents useful in compositions provided by the present disclosure include compounds that are reactive with the terminal groups of the bis(sulfonyl)alkanol-containing polythioether, such as compounds that are reactive with hydroxyl groups, alkenyl groups, epoxy groups, thiol groups, amine groups, or isocyanate groups.

Examples of useful curing agents that are reactive with hydroxyl groups include diisocyanates and polyisocyanates, examples of which are disclosed herein.

Examples of useful curing agents that are reactive with alkenyl groups include dithiols and polythiols, examples of which are disclosed herein.

Polyalkoxysilyl-terminated bis(sulfonyl)alkanol-containing polythioethers provided by the present disclosure can hydrolyze in the presence of water inducing self-polymerization via condensation. Catalysts for use with polyalkoxysilyl-terminated bis(sulfonyl)alkanol-containing polythioether include organotitanium compounds such as tetraisopropoxy titanium, tetra-tert-butoxy titanium, titanium di(isopropoxy) bis(ethylacetoacetate), and titanium di(isopropoxy)bis (acetylacetoacetate); organic tin compounds dibutyltin dilaurate, dibutyltin bisacetylacetoacetate, and tin octylate; metal dicarboxylates such as lead dioctylate; organozirconium compounds such as zirconium tetraacetyl acetonate; and organoaluminum compounds such as aluminum triacetyl-acetonate. Other examples of suitable catalysts for moisture curing include diisopropoxy bis(ethyl acetoacetonate)titanium, diisopropoxy bis(acetyl acetonate)titanium, and dibutoxy bis(methyl acetoacetonate)titanium. It can be appreciated that because the curing agent for polyalkoxysilyl-terminated bis(sulfonyl)alkanol-containing polythioether can be atmospheric moisture, it is not necessary to include a curing agent to a curable composition containing polyalkoxysilyl-terminated bis(sulfonyl)alkanol-containing polythioether. Therefore, compositions comprising polyalkoxysilyl-terminated bis(sulfonyl)alkanol-containing polythioether and a curing agent for the polyalkoxysilyl group refer to atmospheric moisture.

Compositions provided by the present disclosure may contain from about 90% to about 150% of the stoichiometric amount, from about 95% to about 125%, and in certain embodiments, from about 95% to about 105% of the amount of the selected curing agent(s).

Additional Sulfur-Containing Polymers

In certain embodiments, compositions provided by the present disclosure comprise, in addition to a bis(sulfonyl) alkanol-containing polythioether or prepolymer thereof, or a reaction product of any one of the reactions disclosed herein, or a combination of any of the foregoing, one or more additional sulfur-containing polymers. A sulfur-containing polymer can be any polymer having at least one sulfur atom in the repeating unit, including, but not limited to, polymeric thiols, polythiols, thioethers, polythioethers, sulfur-containing polyformals, and polysulfides. A "thiol," as used herein, refers to a compound comprising a thiol or mercaptan group, that is, an "SH" group, either as the sole functional group or in combination with other functional groups, such as hydroxyl groups, as is the case with, for example, thioglycerols. A polythiol refers to such a compound having more than one SH group, such as a dithiol or higher functionality thiol. Such groups are typically terminal and/or pendant such that they have an active hydrogen that is reactive with other functional groups. A polythiol can comprise both a terminal and/or pendant sulfur (—SH) and a non-reactive sulfur atom (—S— or —S—S—). Thus, the term polythiol generally encompasses polythioethers and polysulfides.

Examples of additional sulfur-containing polymers useful in compositions provided by the present disclosure include, for example, those disclosed in U.S. Pat. Nos. 6,172,179, 6,509,418, and 7,009,032. In certain embodiments, compositions provided by the present disclosure comprise a polythioether having the structure of Formula (29):

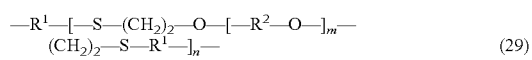
(29)

wherein $R^1$ is selected from a $C_{2-6}$ alkanediyl, $C_{6-8}$ cycloalkanediyl, $C_{6-10}$ cycloalkanealkanediyl, $—[(—CH_2—)_s—X—]_q—(—CH_2—)_r—$, and $—[(—CH_2—)_s—X—]_q—(—CH_2—)_r—$ in which at least one $—CH_2—$ unit is substituted with a methyl group; $R^2$ is selected from $C_{2-6}$ alkanediyl, $C_{6-8}$ cycloalkanediyl, $C_{6-10}$ cycloalkanealkanediyl, and $—[(—CH_2—)_s—X—]_q—(—CH_2—)_r—$; X is selected from O, S, and $—NR^5—$, where $R^5$ is selected from hydrogen and methyl; m is an integer from 0 to 10; n is an integer from 1 to 60; p is an integer from 2 to 6; q is an integer from 1 to 5, and r is an integer from 2 to 10. Such polythioethers are described in U.S. Pat. No. 6,172,179 at col. 2, line 29 to col. 4, line 34.

The one or more additional sulfur-containing polymers may be difunctional or multifunctional, for example, having from 3 to 6 terminal groups, or a mixture thereof.

In certain embodiments, compositions provided by the present disclosure comprise from about 10 wt % to about 90 wt % of a sulfur-containing polymer provided by the present disclosure, from about 20 wt % to about 80 wt %, from about 30 wt % to about 70 wt %, and in certain embodiments from about 40 wt % to about 60 wt %, where wt % is based on the total weight of all non-volatile components of the composition (i.e., the dry weight).

As used herein, the term polysulfide refers to a polymer that contains one or more sulfide linkages, i.e., $—S_x—$ linkages, where x is from 2 to 4, in the polymer backbone and/or in pendant positions on the polymer chain. In certain embodiments, the polysulfide polymer will have two or more sulfur-sulfur linkages. Suitable polysulfides are commercially available, for example, from Akzo Nobel and Toray Fine Chemicals under the names Thiokol-LP and Thioplast®. Thioplast® products are available in a wide range of molecular weights ranging, for example, from less than 1,100 to over 8,000, with molecular weight being the average molecular weight in grams per mole. In some cases, the polysulfide has a number average molecular weight of 1,000 Daltons to 4,000 Daltons. The crosslink density of these products also varies, depending on the amount of crosslinking agent used. The —SH content, i.e., thiol or mercaptan content, of these products can also vary. The mercaptan content and molecular weight of the polysulfide can affect the cure speed of the polymer, with cure speed increasing with molecular weight.

Sulfur-containing polyformal prepolymers useful in aerospace sealant applications are disclosed, for example, in U.S. Application Publication No. 2012/0234205 and in U.S. Application Publication No. 2012/0238707.

In certain embodiments, the sulfur-containing polymer is selected from a polythioether and a polysulfide, and a combination thereof. In certain embodiments a sulfur-containing polymer comprises a polythioether, and in certain embodiments, a sulfur-containing polymer comprises a polysulfide. A sulfur-containing polymer may comprise a mixture of different polythioethers and/or polysulfides, and the polythioethers and/or polysulfides may have the same or different functionality. In certain embodiments, a sulfur-containing polymer has an average functionality from 2 to 6, from 2 to 4, from 2 to 3, and in certain embodiments, from 2.05 to 2.5. For example, a sulfur-containing polymer can be selected from a difunctional sulfur-containing polymer, a trifunctional sulfur-containing polymer, and a combination thereof.

A curing agent may be selected that is reactive with the terminal groups of the sulfur-containing polymer and the sulfur-containing compound. In certain embodiments, a sulfur-containing polymer and a sulfur-containing compound provided by the present disclosure comprise the same groups reactive with the curing agent. For example, in certain embodiments, both a sulfur-containing polymer and a sulfur-containing compound provided by the present disclosure comprise reactive thiol groups, and the curing agent comprises reactive alkenyl groups, epoxy groups, isocyanate groups, Michael acceptor groups, or groups comprising a saturated carbon bearing a leaving group that are well suited for nucleophilic substitution such as, for example, —Cl, —Br, —I, —OSO$_2$CH$_3$ (mesylate), —OSO$_2$—C$_6$H$_4$—CH$_3$ (tosylate), etc.

In certain embodiments, a copolymerizable adhesion promoting adduct provided by the present disclosure may be present in amount from 0.1 wt % to 15 wt % of a composition, less than 5 wt %, less than 2 wt %, and in certain embodiments, less than 1 wt %, based on the total dry weight of the composition.

Compositions provided by the present disclosure may include one or more catalysts. A catalyst can be selected as appropriate for the curing chemistry employed. In certain embodiments, for example, when curing thiol-terminated bis(sulfonyl)alkanol-containing polythioethers or prepolymers and polyepoxides, the catalyst is an amine catalyst. A cure catalyst may be present in an amount from 0.1 to 5 weight percent, based on the total weight of the composition. Examples of suitable catalysts include 1,4-diazabicyclo[2.2.2]octane (DABCO®, commercially available from Air Products, Chemical Additives Division, Allentown, Pa.) and DMP-30® (an accelerant composition including 2,4,6-tris(dimethylaminomethyl)phenol.

In certain embodiments, compositions provided by the present disclosure comprise one or more than one adhesion promoters. A one or more additional adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art.

In certain embodiments, a composition provided by the present disclosure comprises an ethylenically unsaturated silane, such as, for example, a sulfur-containing ethylenically unsaturated silane, which can improve the adhesion of a cured sealant to a metal substrate. As used herein, the term sulfur-containing ethylenically unsaturated silane refers to a molecular compound that comprises, within the molecule, (i) at least one sulfur (S) atom, (ii) at least one, in some cases at least two, ethylenically unsaturated carbon-carbon bonds, such as a carbon-carbon double bonds (C=C); and (iii) at least one silane group, —Si(—R)$_m$(—OR)$_{3-m}$, where each R is independently selected from hydrogen, alkyl, cycloalkyl, aryl, and others, and m is selected from 0, 1, and 2. Examples of ethylenically unsaturated silanes are disclosed in U.S. Publication No. 2012/0040104, which is incorporated by reference in its entirety.

In certain embodiments, compositions provided by the present disclosure may be cured using actinic radiation. Examples of compositions comprising polythioether compositions curable using actinic radiation are disclosed in U.S. Publication no. 2012/0040104. Such compositions may include, in addition to an adhesion promoting adduct provided by the present disclosure, and one or more sulfur-containing polymers such as thiol-terminated sulfur-containing polymers, a polyene such as a polyvinyl ether including, for example, a polyvinyl ether of Formula (27).

In certain embodiments, compositions provided by the present disclosure comprise one or more curing agents such as an epoxy, an isocyanate, and a combination thereof.

Compositions provided by the present disclosure may include one or more catalysts.

Compositions provided by the present disclosure may comprise one or more different types of filler. Suitable fillers include those commonly known in the art, including inorganic fillers, such as carbon black and calcium carbonate (CaCO$_3$), silica, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

In certain embodiments, compositions provided by the present disclosure include low density filler particles. As used herein, low density, when used with reference to such particles means that the particles have a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839 at paragraphs [0016]-[0052], the cited portion of which is incorporated herein by reference.

In certain embodiments, a low density filler comprises less than 2 wt % of a composition, less than 1.5 wt %, less than 1.0 wt %, less than 0.8 wt %, less than 0.75 wt %, less than 0.7 wt % and in certain embodiments, less than 0.5 wt % of a composition, where wt % is based on the total dry solids weight of the composition.

In certain embodiments, compositions provided by the present disclosure comprise at least one filler that is effective in reducing the specific gravity of the composition. In certain embodiments, the specific gravity of a composition is from 0.8 to 1, 0.7 to 0.9, from 0.75 to 0.85, and in certain embodiments, is 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

In certain embodiments, a thiol-terminated sulfur-containing polymer including a combination of thiol-terminated sulfur-containing polymers comprises from about 50 wt % to about 90 wt % of a composition, from about 60 wt % to about 90 wt %, from about 70 wt % to about 90 wt %, and in certain embodiments, from about 80 wt % to about 90 wt % of the composition, where wt % is based on the total dry solids weight of the composition.

In certain embodiments, a thiol-terminated polythioether including a combination of thiol-terminated polythioethers comprises from about 50 wt % to about 90 wt % of a composition, from about 60 wt % to about 90 wt %, from about 70 wt % to about 90 wt %, and in certain embodiments, from about 80 wt % to about 90 wt % of the composition, where wt % is based on the total dry solids weight of the composition.

A composition may also include any number of additives as desired. Examples of suitable additives include plasticizers, pigments, surfactants, adhesion promoters, thixotropic agents, fire retardants, masking agents, and accelerators (such as amines, including 1,4-diaza-bicyclo[2.2.2]octane, DABCO®), and combinations of any of the foregoing. When used, the additives may be present in a composition in an amount ranging, for example, from about 0% to 60% by weight. In certain embodiments, additives may be present in a composition in an amount ranging from about 25% to 60% by weight.

Uses

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain embodiments, compositions, such as sealants, may be provided as multi-pack compositions, such as two-pack compositions, wherein one package comprises one or more thiol-terminated polythioethers provided by the present disclosure and a second package comprises one or more polyfunctional sulfur-containing epoxies provided by the present disclosure. Additives and/or other materials may be added to either package as desired or necessary. The two packages may be combined and mixed prior to use. In certain embodiments, the pot life of the one or more mixed thiol-terminated polythioethers and epoxies is at least 30 minutes, at least 1 hour, at least 2 hours, and in certain embodiments, more than 2 hours, where pot life refers to the period of time the mixed composition remains suitable for use as a sealant after mixing.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a method for sealing an aperture comprises applying a sealant composition provided by the present disclosure to defining surface of an aperture and curing the sealant, to provide a sealed aperture.

In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% relative humidity to 100% relative humidity. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation, such as ultraviolet radiation. As will also be appreciated, the methods may be used to seal apertures on aerospace vehicles including aircraft and aerospace vehicles.

In certain embodiments, the composition achieves a tack-free cure in less than about 2 hours, less than about 4 hours, less than about 6 hours, less than about 8 hours, and in certain embodiments, less than about 10 hours, at a temperature of less than about 200° F.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured compositions of the present disclosure becomes fully developed within 7 days following mixing and application of a curable composition to a surface.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated herein by reference. It is also desirable that, when cured, compositions of the present disclosure used in aviation and aircraft applications exhibit a percent volume swell not greater than 25% following immersion for one week at 60° C. (140° F.) and ambient pressure in JRF Type I. Other properties, ranges, and/or thresholds may be appropriate for other sealant applications.

In certain embodiments, therefore, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28%±1% by volume; cyclohexane (technical): 34%±1% by volume; isooctane: 38%±1% by volume; and tertiary dibutyl disulfide: 1%±0.005% by volume (see AMS 2629, issued Jul. 1, 1989, §3.1.1 etc., available from SAE (Society of Automotive Engineers)).

In certain embodiments, compositions provided herein provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, that exhibits a lap shear strength of greater than 200 psi, such as at least 220 psi, at least 250 psi, and, in some cases, at least 400 psi, when measured according to the procedure described in SAE AS5127/1 paragraph 7.8.

In certain embodiments, a cured sealant comprising a composition provided by the present disclosure meets or exceeds the requirements for aerospace sealants as set forth in AMS 3277.

Apertures, including apertures of aerospace vehicles, sealed with compositions provided by the present disclosure are also disclosed.

In certain embodiments, a cured sealant provided by the present disclosure exhibits the following properties when cured for 2 days at room temperature, 1 day at 140° F., and 1 day at 200° F.: a dry hardness of 49, a tensile strength of 428 psi, and an elongation of 266%; and after 7 days in JRF Type I, a hardness of 36, a tensile strength of 312 psi, and an elongation of 247%.

In certain embodiments, compositions provided by the present disclosure exhibit a Shore A hardness (following 7-day cure) greater than 10, greater than 20, greater than 30, and in certain embodiments, greater than 40; a tensile strength greater than 10 psi, greater than 100 psi, greater than 200 psi, and in certain embodiments, greater than 500 psi; an elongation greater than 100%, greater than 200%, greater than 500%, and in certain embodiments, greater than 1,000%; and a swell following exposure to JRF Type I (7 days) less than 20%.

EXAMPLES

Embodiments provided by the present disclosure are further illustrated by reference to the following examples, which describe the synthesis, properties, and uses of certain adhesion promoting adducts and compositions comprising adhesion promoting adducts. It will be apparent to those skilled in the art that many modifications, both to materials, and methods, may be practiced without departing from the scope of the disclosure. In the following examples, Permapol® P3.1E is a thiol-terminated polymer and the accelerator S-5304 is an epoxy compound, both commercially available from PRC-DeSoto, International, Inc., Sylmar, Calif. DABCO® 33-LV is an amine catalyst, commercially available from Air Products and Chemicals, Inc.

Example 1

Adhesion Promoting Adduct of Silquest® A-1120 and 2-(Methacryloyloxy)Ethyl Acetoacetate (2-MEAA)

Silquest® A-1120 (1 mole, 222.36 g) and ethanol were charged into a 50-mL 3-necked round-bottomed flask. The flask was flushed with nitrogen and fitted with an addition funnel and a temperature probe. 2-(Methacryloyloxy)ethyl acetoacetate (2-MEAA, 1 mole, 214.11 g) and ethanol were charged into a 50-ml addition funnel. 1,8-Diazabicycloundec-7-ene (DBU) (0.027 g; 1 drop from a regular plastic pipette) was added into the silane. The 2-MEAA solution was added drop-wise over 2.75 hours and the mixture stirred for 3 days. The product was used as a 50% solution in ethanol. The reaction is outlined in FIG. 1.

A sealant (Sealant 1) was prepared having the composition of Table 1.

TABLE 1

| | Amount (g) |
|---|---|
| Permapol ® P3.1E Polymer | 10.00 |
| Aminosilane adhesion promoting adduct of Example 1 | 0.20 |
| Calcium carbonate (CaCO₃) | 5.00 |
| Accelerator S-5304 | 2.97 |
| DABCO ® 33-LV | 0.08 |

Permapol® P3.1E and the aminosilane adhesion promoting adduct (0.4 g of 50% solution) were weighed in a mixing cup and mixed in Hauschild mixer for 30 seconds. CaCO₃ was added and mixed for 30 sec. The contents were hand-mixed and then mixed again in the Hauschild mixer for 30 seconds. Accelerator S-5304 was added, hand-mixed and mixed again with the Hauschild mixer for 30 seconds. Catalyst DABCO® 33-LV was added (3 drops from a plastic pipette) and the contents mixed. The cured sealant (24 hours at 140° F.) had a hardness of 35 (Shore A), and the percent cohesive failure for the tested surfaces is shown in Table 2.

TABLE 2

| Substrates | Example 1 % cohesive failure |
|---|---|
| Chromic Acid Anodized Aluminum | 100% |
| Sulfuric Acid anodized Aluminum | 100% |
| Mil-C-27725 | 100% |
| Alodine ® 1200 | 50% |
| Titanium (per AMS-4911 spec) | 100% |
| Bare Aluminum | 100% |
| Bare Aluminum (Scotch-Brite ®) | 100% |

Example 2

Adhesion Promoting Adduct of Silquest® A-1120 and Benzoquinone (BQ)

Figure 2:
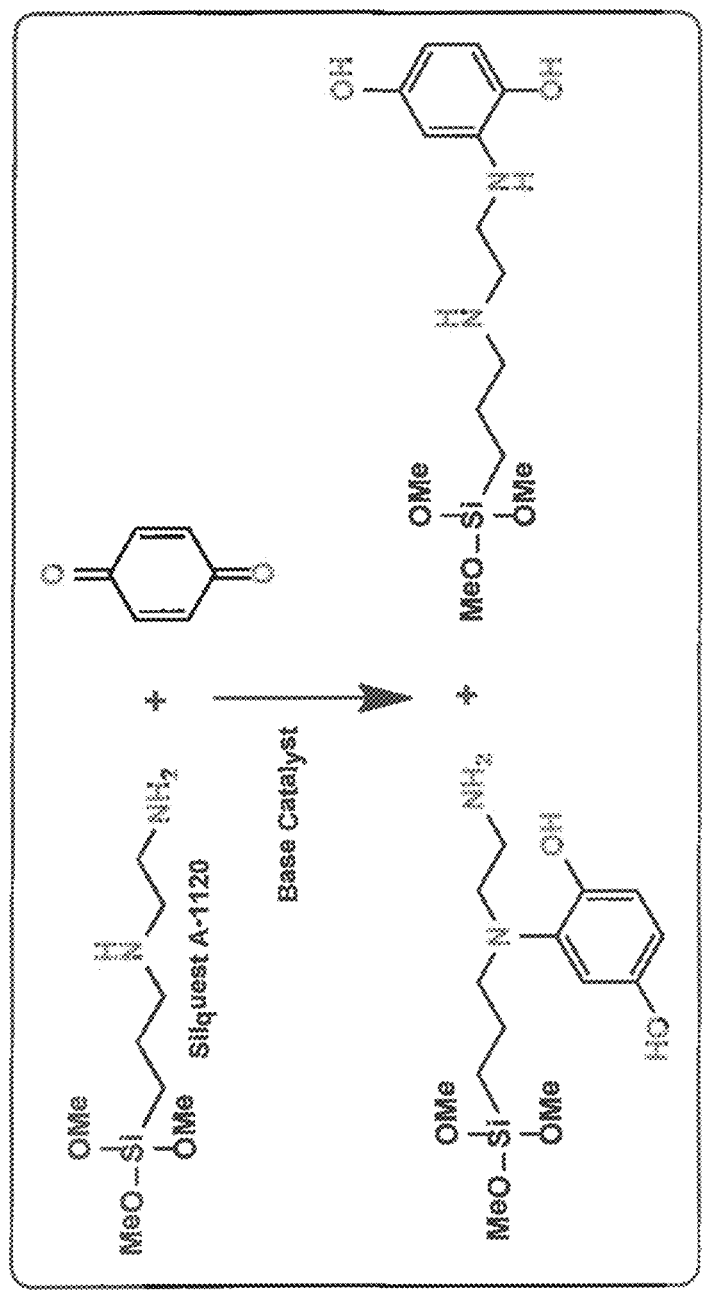
FIG. 2 illustrates the reaction described in Example 2.

Benzoquinone (6.49 g) and ethanol (150 g) were charged in a 250-mL Erlenmeyer flask. While stirring, the contents were heated to dissolve the benzoquinone. After cooling to room temperature, Silquest® A-1120 (13.34 g) and ethanol (20 g) were charged into a 500-mL, 3-necked, round-bottomed flask, the contents flushed with nitrogen; and Polycat® DBU (an amine catalyst, ~0.081 g; 3 drops from a narrow-mouth pipet) was added. The contents were reacted for about 4 hours at room temperature while stirring. The product was obtained as 13.7 wt % in an ethanol solution. The reaction is outlined in FIG. 2.

A first sealant (Sealant 1) was prepared having the composition of Table 3.

TABLE 3

| Components - Sealant 1 | Amount (g) |
|---|---|
| Permapol ® 3.1E Polymer | 10.00 |
| Amino-hydroquinone adhesion promoting adduct In Example 2 | 0.20 |
| Calcium carbonate (CaCO₃) | 5.00 |
| Accelerator S-5304 | 3.09 |
| DABCO ® 33-LV | 0.08 |

Permapol® 3.1E prepolymer and the amino-hydroquinone adhesion promoting adduct (1.46 g of ~14% solution) were weighed in a mixing cup and mixed in Hauschild mixer for 30 seconds. CaCO₃ was added and mixed by hand and in the Hauschild mixer. Accelerator S-5304 was added and mixed. Catalyst DABCO® 33-LV was added (3 drops from a plastic pipette) and mixed.

A second sealant (Sealant 2) was prepared having the composition of Table 4.

TABLE 4

| Components - Sealant 2 | Amount (g) |
|---|---|
| Permapol ® P3.1E Polymer | 10.00 |
| Amino-hydroquinone adhesion promoting adduct of Example 2 | 0.20 |
| Aminosilane adhesion promoting adduct of Example 1 | 0.20 |
| Calcium carbonate (CaCO₃) | 5.00 |
| Accelerator S-5304 | 3.45 |
| DABCO ® 33-LV | 0.08 |

Permapol® P3.1E polymer, Example 1 adduct, (0.4 g of 50% solution) and Example 2 adduct (1.46 g of ~14% solution) were weighed in a mixing cup, hand-mixed and mixed in a Hauschild mixer for 30 seconds. CaCO₃, accelerator S-5304, and catalyst DABCO® 33-LV (3 drops from a regular plastic pipette) were sequentially added and mixed.

The percent cohesive failure for the two cured sealant compositions (24 hours at 140° F.) on several surfaces is provided in Table 5. The hardness (Shore A) of the cured sealants was 39 and 25, respectively.

TABLE 5

| Substrates | Example 2 (Sealant 1) % cohesive failure | Example 2 (Sealant 2) % cohesive failure |
|---|---|---|
| Chromic Acid Anodized Aluminum | 100% | 100% |
| Sulfuric Acid Anodized Aluminum | 100% | 100% |
| Mil-C-27725 | 100% | 100% |
| Alodine ® 1200 | 100% | 100% |
| Titanium (per AMS-4901 spec, Scotch-Brite ®) | 100% | 100% |
| Bare Aluminum (solvent cleaned)) | 100% | 100% |
| Bare Aluminum (Scotch-Brite ®) | 100% | 100% |

Example 3

Adduct of Silquest® A-189 and 1,3-bis(vinylsulfonyl)-2-propanol

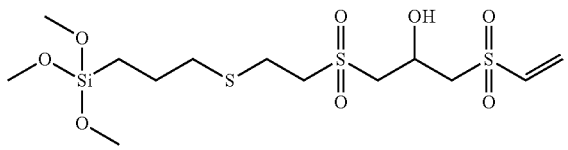 [SMILES: C=CS(=O)(=O)CC(O)CS(=O)(=O)CCSCCC[Si](OC)(OC)OC]

Silquest® A-189 and 1,3-bis(vinylsulfonyl)-2-propanol were reacted in the presence of DBU to provide the corresponding adhesion promoting adduct.

A sealant was prepared having the composition of Table 6.

TABLE 6

| Components | Amount (g) |
|---|---|
| Permapol ® P3.1E Polymer | 6.44 |
| Aminosilane adhesion promoting adduct of Example 3 | 0.42 |
| Calcium carbonate (CaCO₃) | 1.93 |
| Accelerator S-5304 | 1.33 |
| DABCO ® 33-LV | 0.05 |

Adhesion specimens were cured for 5 days at room temperature followed by curing from 27 hours at 140° F. The percent cohesive failure of the cured sealant samples are shown in Table 7.

TABLE 7

| Surface | Cohesive Failure (%) |
|---|---|
| Bare Aluminum (Scotch-Brite ®) | 100% |
| Alodine ® 1200 | 100% |

Comparative Example 1

Permapol® P3.1E polymer (10 g, a thiol-terminated polymer, commercially available from PRC-DeSoto International, Sylmar, Calif.) and calcium carbonate (5.0 g) were mixed in Hauschild mixer for 30 seconds at 2300 rpm. An accelerator S-5304 (2.6 g, an epoxy paste, commercially available from PRC-DeSoto International, Sylmar, Calif.), and the catalyst triethylenediamine (0.08 g) were sequentially added and mixed. Samples were applied on various substrates and cured at room temperature for 24 hours followed by curing for 48 hours at 140° F. The percent cohesive failure was measured by peeling the sample from the substrates. The results are shown in Table 8.

TABLE 8

| Substrates | Comparative Example 1 % cohesive failure |
|---|---|
| Chromic Acid Anodized Aluminum | 0 |
| Sulfuric Acid Anodized Aluminum | 0 |
| Mil-C-27725 | 0 |
| Alodine ® 1200 | 0 |
| Titanium (per AMS-4911 spec) | 0 |
| Bare Aluminum | 0 |
| Bare Aluminum (Scotch-Brite ®) | 0 |

Example 4

Density Functional Theory Calculation

The Gibbs free energy of interaction of various functional groups with an $Al_4O_6$ cluster (Li et al., "Structural determination of $(Al_2O_3)_n$ (n=1-7) clusters based on density functional calculation," Computational and Theoretical Chemistry 2012, 996, 125-131) representing an aluminum oxide surface of a representative aerospace substrate was calculated using density functional theory (DFT) based method. All structures were optimized using Gaussian09/B3LYP/6-31g (d) and vibrational frequency was calculated at the same level of theory to confirm that the structures are at local minimum. A single point energy calculation with a CPCM salvation scheme was used to calculate the energy in a water environment. The Gibbs free energy of the interaction was calculated under standard conditions of pressure and temperature (1 atm and 25° C.) without correction.

Various functional groups were analyzed for their inherent properties, including energy of HOMO (highest occupied molecular orbital), LUMO (lowest unoccupied molecular orbital), and energy gap between HOMO and LUMO. Typically, functional groups with higher HOMO energy are more electron donating, and those with lower LUMO energy are more electron accepting. Comparing various functional groups in Table 9, 3-hydroxy-1,2-dimethylpyridin-4(1H)-one (HOPO) has highest HOMO energy, indicating HOPO is most electron donating. The functional group bis(sulfonyl)-2-prpanol (BSP), on the other hand, has the lowest HOMO energy, indicating it is least electron donating.

TABLE 9

Calculated properties of various functional groups.

| Compounds | HOMO (eV) | LUMO (eV) | Gap (eV) |
|---|---|---|---|
|  acetoacetate | −7.02 | −0.62 | 6.40 |
|  BSP | −7.54 | 0.62 | 8.16 |
| 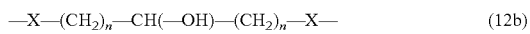 HOPO | −5.39 | −0.45 | 4.95 |

The interaction between various functional groups and an aluminum oxide cluster was determined. The Gibbs free energy of interaction in the gas phase ($\Delta G_g$) as well as in water ($\Delta G_w$) was calculated and the results are shown in FIG. 3, along with contribution from enthalpy ($\Delta H$) of the reaction. In FIG. 3 more negative AG corresponds to a more stable complex or a stronger interaction between the functional group and aluminum oxide. BSP and HOPO have a stronger interaction than acetoacetate with aluminum oxide in the gas phase as well as in a simulated water environment. Acetoacetate binds to $Al_4O_6$ through coordination of electron rich carbonyl oxygen (in acetoacetate) with electron deficient aluminum (in $Al_4O_6$). HOPO interacts with $Al_4O_6$ as a bi-dentate ligand: i.e., carbonyl oxygen (in HOPO) binds to aluminum (in $Al_4O_6$) and the hydroxyl group (in HOPO) is hydrogen bonded with oxygen (in $Al_4O_6$). A tri-dentate binding mode for BSP with $Al_4O_6$ was identified: two sulfonyl groups (in BSP) bind to two aluminum atoms (in $Al_4O_6$) in addition to the hydrogen bond between hydroxyl group (in BSP) and oxygen atom (in $Al_4O_6$). Even though BSP is not very electron donating (as shown by the low HOMO energy in Table 9), strong binding with $Al_4O_6$ with three coordination sites is nevertheless observed.

In conclusion, the BSP functional group was shown to bind to aluminum oxide through tri-dentate mode, resulting in very strong interaction (adhesion). Unlike other strong binding ligands such as HOPO, BSP is difficult to oxidize and is expected to have good stability. Structures with binding motifs similar to that of BSP can also lead to strong binding toward aluminum oxide.

Similar methods may be used to identify other metal ligands appropriate for enhancing adhesion to a particular metal surface and that may be incorporated into the backbone of a prepolymer and/or provided as a terminal group of a prepolymer as described in the present disclosure.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. An adhesion promoting adduct having a structure of Formula (13):

$$R^{11}-P-R^{12'}-R^{13'}-M-R^{14} \tag{13}$$

wherein,
$R^{11}$ comprises an adhesion promoting group;
P comprises a core of an adhesion promoter $R^{11}-P-R^{12}$;
M comprises a metal ligand, wherein the metal ligand comprises a moiety of Formula (12a), Formula (12b), Formula (12c), Formula (12d), Formula (12e), or a combination of any of the foregoing:

$$-X-(CH_2)_n-CH(-OH)- \tag{12a}$$

$$-X-(CH_2)_n-CH(-OH)-(CH_2)_n-X- \tag{12b}$$

$$-CH(-OH)-(CH_2)_n-X-(CH_2)_n-CH(-OH)- \tag{12c}$$

$$-CH(-OH)-R^5-CH(-OH)- \tag{12d}$$

$$-C(O)-R^5-C(O)- \tag{12e}$$

wherein,
each X is independently selected from —C(O)— and —S(O)$_2$—,
n is an integer from 1 to 3; and
$R^5$ is $C_{1-4}$ alkanediyl;
$R^{12'}$ and $R^{13'}$ represent moieties derived from the reaction of $R^{12}$ and $R^{13}$ of the adhesion promoter $R^{11}-P-R^{12}$ and a metal chelating agent $R^{13}$-M-$R^{14}$, wherein $R^{12}$ and $R^{13}$ comprise mutually reactive functional groups, and
$R^{14}$ comprises a reactive functional group selected from a thiol group, an epoxy group, an isocyanate group, an alkenyl group, and a Michael acceptor group.

2. The adhesion promoting adduct of claim 1, wherein $R^{14}$ comprises a Michael acceptor group.

3. The adhesion promoting adduct of claim 1, wherein the adhesion promoting group comprises a polyalkoxysilyl, a phosphonate, an amine, a carboxylic acid, or a phosphonic acid.

4. The adhesion promoting adduct of claim 1, wherein $R^{12}$ comprises an alkenyl group, a thiol group, or an amine group.

5. The adhesion promoting adduct of claim 1, wherein the adhesion promoter comprises a thiol-terminated polyalkoxysilane.

6. The adhesion promoting adduct of claim 1, wherein the adhesion promoter comprises a structure of Formula (14a), a structure of Formula (14b), a structure of Formula (14c), or a combination of any of the foregoing:

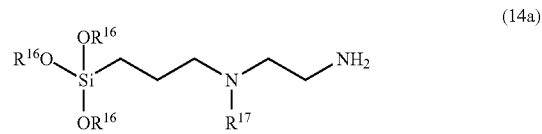

(14a)

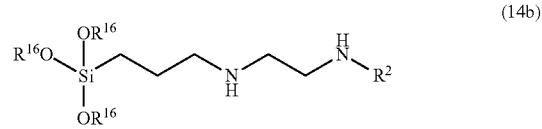

(14b)

-continued

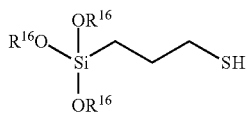
(14c)

wherein each $R^{16}$ is independently selected from $C_{1-3}$ alkyl; and $R^{17}$ is selected from hydrogen and $C_{1-3}$ alkyl.

7. The adhesion promoting adduct of claim 1, wherein the metal ligand comprises a bis(sulfonyl)alkanol, a quinone, an acetylacetonate, a hydroxypyridinone, or a combination of any of the foregoing.

8. The adhesion promoting adduct of claim 1, wherein, the adhesion promoter comprises an amino-terminated polyalkoxysilane or a thiol-terminated polyalkoxysilane; and the metal ligand comprises a bis(sulfonyl)alkanol, a quinone, an acetylacetonate, or a hydroxypyridinone.

9. The adhesion promoting adduct of claim 1, wherein the metal ligand comprises a group capable of forming a coordination complex with aluminum, Al(III), aluminum oxide, titanium, titanium oxide, anodized aluminum, chromate conversion coated aluminum, or a combination of any of the foregoing.

10. The adhesion promoting adduct of claim 1, wherein the metal ligand is capable of forming a coordination complex with Al(III).

11. The adhesion promoting adduct of claim 1, wherein the metal chelating agent comprises an aluminum oxide or Al(III) ligand selected from 2,3-dihydroxybenzoic acid, 5-nitrosalicylate, 3-hydroxy-4-pyridinone, 3-hydroxy-2-pyridinone, 2-2'-dihydroxyazobenzene, 8-hydroxyquinoline, oxylate, malonate, citrate, inimodiacetic acid, picolinic acid, maltol, kojic acid, N,N'-diacetic acid (EDTA), N-(2-hydroxy)ethylenediamenetriacetic acid (HEDTA), ethylenediamine-N,N'-bis(2-hydroxyphenylacetic acid (EDDHA), and N,N'-bis(hydroxybenzyl)ethylenediamene-N,N'-diacetic acid (HBED), acetoacetate, quinone, and a combination of any of the foregoing.

12. The adhesion promoting adduct of claim 1, wherein —$R^{13'}$-M-$R^{14}$ has the structure:

—CH$_2$—CH$_2$—S(O)$_2$—$R^{15}$—CH(—OH)—$R^{15}$—S(O)$_2$—CH=CH$_2$, or

—CH$_2$—CH$_2$—S(O)$_2$—CH$_2$—CH(—OH)—CH$_2$—S(O)$_2$—CH=CH$_2$ wherein each $R^{15}$ is independently selected from $C_{1-3}$ alkanediyl and substituted $C_{1-3}$ alkanediyl, wherein the one or more substituent groups is —OH.

13. A composition comprising the adhesion promoting adduct of claim 1.

14. A cured sealant formed from the composition of claim 13.

15. An adhesion promoting adduct having the structure of Formula (15):

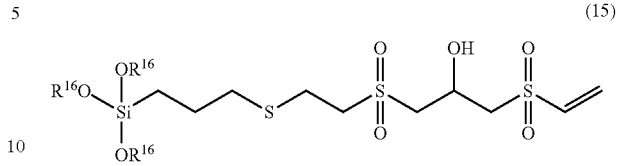
(15)

wherein each $R^{16}$ is independently selected from $C_{1-3}$ alkyl.

16. A composition comprising the adhesion promoting adduct of claim 15.

17. A cured sealant formed from the composition of claim 16.

18. A copolymerizable adhesion promoting adduct having the structure of Formula (21):

$$B(-V^{1'}-R^{14'}-M-R^{13'}-R^{12'}-P-R^{11})_{z1}(-V^2)_{z-z1} \quad (21)$$

wherein, $R^{11}$ comprises an adhesion promoting group;

P comprises a core of an adhesion promoter $R^{11}$—P—$R^{12}$;

M comprises a metal ligand;

$R^{12'}$ and $R^{13'}$ represent moieties derived from the reaction of $R^{12}$ and $R^{13}$ of the adhesion promoter $R^{11}$—P—$R^{12}$ and metal chelating agent $R^{13}$-M-$R^{14}$, wherein $R^{12}$ and $R^{13}$ comprise mutually reactive functional groups, and $R^{14}$ comprises a reactive functional group reactive with —$V^1$;

B represents a core of a z-valent polyfunctionalizing agent of Formula (22):

$$B(-V^1)_{z1}(-V^2)_{z-z1} \quad (22)$$

wherein, z is an integer from 3 to 6;

z1 is an integer from 1 to z–1;

each —$V^1$ is a group comprising a first reactive functional group; and at least one —$V^2$ comprises a thiol group, an alkenyl group, an epoxy group, an isocyanate group, or a Michael acceptor group; and each $R^{14'}$ represents a moiety derived from the reaction of $R^{14}$ and —$V^1$; and each —$V^{1'}$— and $R^{14'}$ is derived from the reaction of —$V^1$ with $R^{14}$.

19. The copolymerizable adhesion promoting adduct of claim 18, comprising the reaction product of reactants comprising:

a polyfunctionalizing agent of Formula (22):

$$B(-V^1)_{z1}(-V^2)_{z-z1} \quad (22)$$

wherein,

B represents a core of a z-valent polyfunctionalizing agent B(—V)$_z$ wherein:

z is an integer from 3 to 6;

z1 is an integer from 1 to z–1;

each —$V^1$ is a group comprising a first reactive functional group; and at least one —$V^2$ comprises a thiol group, an alkenyl group, an epoxy group, an isocyanate group, or a Michael acceptor group; and an adhesion promoting adduct comprising an adhesion promoting group, a metal ligand, and a third functional group reactive with the first reactive functional group.

20. A composition comprising the copolymerizable adhesion promoting adduct of claim 18.

21. A cured sealant formed from the composition of claim 20.

22. A copolymerizable sulfur-containing adhesion promoting adduct of Formula (23);

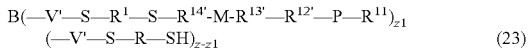

$$B(-V'-S-R^1-S-R^{14'}\text{-M-}R^{13'}-R^{12'}-P-R^{11})_{z1}$$
$$(-V'-S-R-SH)_{z-z1} \quad (23)$$

wherein
 each $R^1$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_s-X-]_q-(CHR^3)_r-$;
  wherein:
   each $R^3$ is independently selected from hydrogen and methyl;
   each X is independently selected from $-O-$, $-S-$, and $-NR-$ wherein R is selected from hydrogen and methyl;
   s is an integer from 2 to 6;
   q is an integer from 1 to 5; and
   r is an integer from 2 to 10;
  $R^{11}$ comprises an adhesion promoting group;
  P comprises a core of an adhesion promoter $R^{11}-P-R^{12}$;
  M comprises a metal ligand;
  $R^{12'}$ and $R^{13'}$ represent moieties derived from the reaction of $R^{12}$ and $R^{13}$ of the adhesion promoter $R^{11}-P-R^{12}$ and metal chelating agent $R^{13}\text{-M-}R^{14}$, wherein $R^{12}$ and $R^{13}$ comprise mutually reactive functional groups, and $R^{14}$ comprises a group reactive with a thiol $-SH$ group;
  $R^{14'}$ represents a moiety derived from the reaction of $R^{14}$ and a thiol group;
  B represents a core of a z-valent polyfunctionalizing agent $B(-V)_z$ wherein:
   z is an integer from 3 to 6;
   z1 is an integer from 1 to z−1; and
   each $-V$ is a group comprising a group reactive with a thiol group; and
   each $-V'-$ and $R^{14'}$ is derived from the reaction of $-V$ with a thiol group.

23. The copolymerizable sulfur-containing adhesion promoting adduct of claim 22, comprising the reaction product of reactants comprising:
 a dithiol;
 a polyfunctionalizing agent comprising functional groups reactive with thiol groups; and
 an adhesion promoting adduct comprising an adhesion promoting group and functional groups reactive with thiol groups.

24. A composition comprising the copolymerizable adhesion promoting adduct of claim 22.

25. A cured sealant formed from the composition of claim 24.

26. A composition comprising:
 an adhesion promoting adduct; and
 a sulfur-containing prepolymer,
 wherein the adhesion promoting adduct comprises a structure of Formula (13):

$$R^{11}-P-R^{12'}-R^{13'}\text{-M-}R^{14} \quad (13)$$

wherein,
 $R^{11}$ comprises an adhesion promoting group;
 P comprises a core of an adhesion promoter $R^{11}-P-R^{12}$;
 M comprises a metal ligand;
 $R^{12'}$ and $R^{13'}$ represent moieties derived from the reaction of $R^{12}$ and $R^{13}$ of the adhesion promoter $R^{11}-P-R^{12}$ and a metal chelating agent $R^{13}\text{-M-}R^{14}$, wherein $R^{12}$ and $R^{13}$ comprise mutually reactive functional groups, and
 $R^{14}$ comprises a reactive functional group selected from a thiol group, an epoxy group, an isocyanate group, an alkenyl group, and a Michael acceptor group.

27. The composition of claim 26, wherein the sulfur-containing prepolymer comprises a thiol-terminated sulfur-containing prepolymer selected from a thiol-terminated polythioether prepolymer, a thiol-terminated polysulfide prepolymer, a thiol-terminated sulfur-containing polyformal prepolymer, and a combination of any of the foregoing.

28. The composition of claim 26, wherein the sulfur-containing prepolymer comprises a thiol-terminated polythioether prepolymer.

29. The composition of claim 26, formulated as a sealant composition.

30. A cured sealant formed from the composition of claim 29.

31. An adhesion promoting adduct having a structure of Formula (13):

$$R^{11}-P-R^{12'}-R^{13'}\text{-M-}R^{14} \quad (13)$$

wherein,
 $R^{11}$ comprises an adhesion promoting group;
 P comprises a core of an adhesion promoter $R^{11}-P-R^{12}$;
 M comprises a metal ligand;
 $R^{12'}$ and $R^{13'}$ represent moieties derived from the reaction of $R^{12}$ and $R^{13}$ of the adhesion promoter $R^{11}-P-R^{12}$ and a metal chelating agent $R^{13}\text{-M-}R^{14}$, wherein $R^{12}$ and $R^{13}$ comprise mutually reactive functional groups, and
 $R^{14}$ comprises a vinylsulfonyl group.

32. The adhesion promoting adduct of claim 31, wherein the adhesion promoting group comprises a polyalkoxysilyl, a phosphonate, an amine, a carboxylic acid, or a phosphonic acid.

33. The adhesion promoting adduct of claim 31, wherein $R^{12}$ comprises an alkenyl group, a thiol group, or an amine group.

34. The adhesion promoting adduct of claim 31, wherein the adhesion promoter comprises a thiol-terminated polyalkoxysilane.

35. The adhesion promoting adduct of claim 31, wherein the adhesion promoter comprises a structure of Formula (14a), a structure of Formula (14b), a structure of Formula (14c), or a combination of any of the foregoing:

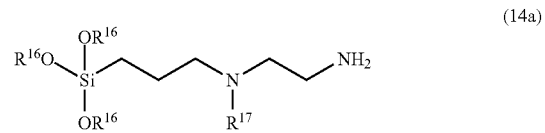

(14a)

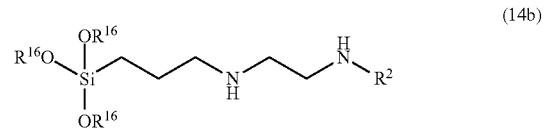

(14b)

-continued

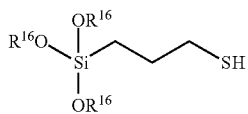
(14c)

wherein
each $R^{16}$ is independently selected from $C_{1-3}$ alkyl; and $R^{17}$ is selected from hydrogen and $C_{1-3}$ alkyl.

36. The adhesion promoting adduct of claim 31, wherein the metal ligand comprises a bis(sulfonyl)alkanol, a quinone, an acetylacetonate, a hydroxypyridinone, or a combination of any of the foregoing.

37. The adhesion promoting adduct of claim 31, wherein,
the adhesion promoter comprises an amino-terminated polyalkoxysilane or a thiol-terminated polyalkoxysilane; and
the metal ligand comprises a bis(sulfonyl)alkanol, a quinone, an acetylacetonate, or a hydroxypyridinone.

38. The adhesion promoting adduct of claim 31, wherein the metal ligand comprises a group capable of forming a coordination complex with aluminum, Al(III), aluminum oxide, titanium, titanium oxide, anodized aluminum, chromate conversion coated aluminum, or a combination of any of the foregoing.

39. The adhesion promoting adduct of claim 31, wherein the metal ligand is capable of forming a coordination complex with Al(III).

40. The adhesion promoting adduct of claim 31, wherein the metal chelating agent comprises an aluminum oxide or Al(III) ligand selected from 2,3-dihydroxybenzoic acid, 5-nitrosalicylate, 3-hydroxy-4-pyridinone, 3-hydroxy-2-pyridinone, 2-2'-dihydroxyazobenzene, 8-hydroxyquinoline, oxylate, malonate, citrate, inimodiacetic acid, picolinic acid, maltol, kojic acid, N,N'-diacetic acid (EDTA), N-(2-hydroxy)ethylenediamenetriacetic acid (HEDTA), ethylenediamine-N,N'-bis(2-hydroxyphenylacetic acid (EDDHA), and N,N'-bis(hydroxybenzyl)ethylenediamene-N,N'-diacetic acid (HBED), acetoacetate, quinone, and a combination of any of the foregoing.

41. The adhesion promoting adduct of claim 31, wherein —$R^{13'}$-M-$R^{14}$ has the structure:

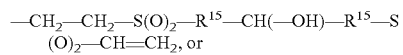

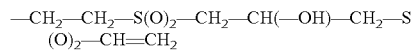

wherein each $R^{15}$ is independently selected from $C_{1-3}$ alkanediyl and substituted $C_{1-3}$ alkanediyl, wherein the one or more substituent groups is —OH.

42. A composition comprising the adhesion promoting adduct of claim 31.

43. A cured sealant formed from the composition of claim 42.

* * * * *